US009786925B2

(12) United States Patent
Tadokoro et al.

(10) Patent No.: US 9,786,925 B2
(45) Date of Patent: Oct. 10, 2017

(54) FUEL CELL AND FUEL CELL USE GAS DIFFUSION ELECTRODE

(75) Inventors: Kenichiro Tadokoro, Futtsu (JP); Takashi Iijima, Futtsu (JP); Hiroshi Kajiro, Futtsu (JP); Hideaki Sawada, Futtsu (JP); Yoichi Matsuzaki, Futtsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 2244 days.

(21) Appl. No.: 11/587,175

(22) PCT Filed: Apr. 22, 2005

(86) PCT No.: PCT/JP2005/008255
§ 371 (c)(1),
(2), (4) Date: Oct. 20, 2006

(87) PCT Pub. No.: WO2005/104275
PCT Pub. Date: Nov. 3, 2005

(65) Prior Publication Data
US 2007/0224479 A1 Sep. 27, 2007

(30) Foreign Application Priority Data

| Apr. 22, 2004 | (JP) | 2004-126538 |
| Oct. 19, 2004 | (JP) | 2004-304083 |
| Nov. 25, 2004 | (JP) | 2004-340481 |
| Nov. 26, 2004 | (JP) | 2004-342296 |
| Nov. 30, 2004 | (JP) | 2004-345627 |
| Apr. 15, 2005 | (JP) | 2005-118370 |

(51) Int. Cl.
H01M 4/86 (2006.01)
H01M 4/90 (2006.01)

(52) U.S. Cl.
CPC ....... H01M 4/9083 (2013.01); H01M 4/8605 (2013.01); H01M 4/90 (2013.01); H01M 2300/0082 (2013.01)

(58) Field of Classification Search
CPC .. Y02E 60/50; H01M 8/10004; H01M 4/8605
USPC ............................. 429/41, 524–534, 450, 483
See application file for complete search history.

(56) References Cited

U.S. PATENT DOCUMENTS

| 4,740,434 A * | 4/1988 | Hirota ..................... H01M 4/96 429/105 |
| 5,316,990 A * | 5/1994 | Cooper .................... B01J 21/18 502/163 |
| 5,500,201 A * | 3/1996 | Binder ..................... C09C 1/56 423/449.2 |
| 5,620,807 A | 4/1997 | Mussell et al. |
| 5,846,670 A * | 12/1998 | Watanabe ............. H01M 4/926 429/530 |
| 6,053,226 A * | 4/2000 | Agostini ................. B60C 19/08 152/209.4 |
| 6,541,150 B1 * | 4/2003 | Xie ....................... H01M 8/1004 429/480 |
| 6,713,020 B2 * | 3/2004 | Kato ....................... H01M 4/92 320/107 |
| 6,818,339 B1 * | 11/2004 | Sugawara ........... H01M 4/8605 429/209 |
| 2002/0004159 A1 * | 1/2002 | Totsuka .................. H01M 4/86 427/115 |
| 2003/0161781 A1 * | 8/2003 | Cabasso ................. B01D 53/02 423/445 R |
| 2006/0105159 A1 * | 5/2006 | O'Hara ............... H01M 8/0234 428/318.6 |
| 2010/0009234 A1 * | 1/2010 | Stefener ......................... 429/30 |
| 2010/0047658 A1 * | 2/2010 | Colquhoun .......... H01M 8/0291 429/465 |

FOREIGN PATENT DOCUMENTS

| JP | 57-063137 | 4/1982 |
| JP | 58-040150 | 3/1983 |
| JP | 04-264367 | 9/1992 |
| JP | 05-036418 | 2/1993 |
| JP | 07-183035 | 7/1995 |
| JP | 09-167622 | 6/1997 |
| JP | 09-265992 | 10/1997 |
| JP | 10-261421 | 9/1998 |
| JP | 11-253811 | 9/1999 |
| JP | 2000-100448 | 4/2000 |

(Continued)

OTHER PUBLICATIONS

Certification of Invention Patent from the Chinese Patent Office for Chinese application No. 2005 8 0012558.0.
Kim Kinoshita, Carbon Electrochemical and Physiochemical Properties, 1988, Table 2.6 on p. 46, DBP Adsorption of Ketjenblack EC.
Canadian Office Action dated May 7, 2009 issued in corresponding Canadian Application No. 2,563,932.
Anson et al., "Multiple Intramolecular Electron Transfer in the Catalysis of the Reduction of Dioxygen by Cobalt meso-Tetrakis(4-pyridyl)porphyrin to which Four $Ru(NH_3)_5$ Groups are Coordinated," J. Am. Chem. Soc. 113: 9564-9570 (1991).

(Continued)

Primary Examiner — Osei Amponsah
(74) Attorney, Agent, or Firm — Birch, Stewart, Kolasch & Birch, LLP

(57) ABSTRACT

A fuel cell comprised of a proton conductive electrolyte film sandwiched between a pair of catalyst layers, wherein the catalyst layer of at least the cathode is comprised of a mixture including a catalyst ingredient, an electrolytic material, and a carbon material, the carbon material is comprised of a catalyst-carrying carbon material carrying the catalyst ingredient and a gas-diffusing carbon material not carrying the catalyst ingredient, and the catalyst-carrying carbon material has an amount of adsorption of water vapor at 25° C. and a relative humidity of 90% of 50 ml/g or more.

26 Claims, No Drawings

(56) References Cited

FOREIGN PATENT DOCUMENTS

| | | | | |
|---|---|---|---|---|
| JP | 2000-123842 | | 4/2000 | |
| JP | 2000-243404 | | 9/2000 | |
| JP | 2001-057215 | | 2/2001 | |
| JP | 2001-357857 | | 12/2001 | |
| JP | 2002-015737 A | | 1/2002 | |
| JP | 2002-25560 A | | 1/2002 | |
| JP | 2002015737 | * | 1/2002 | ............ H01M 4/58 |
| JP | 2002-050367 | | 2/2002 | |
| JP | 2003-036859 | | 2/2003 | |
| JP | 2003-086190 | | 3/2003 | |
| JP | 2003-109614 | | 4/2003 | |
| JP | 2003-109643 | | 4/2003 | |
| JP | 2003109643 | * | 4/2003 | ............ H01M 8/06 |
| JP | 2003-201417 | | 7/2003 | |
| JP | 2003-282079 A | | 10/2003 | |
| JP | 2004-082007 | | 3/2004 | |
| JP | 2004-217507 | | 8/2004 | |
| WO | WO0117047 | * | 3/2001 | ............ H01M 4/02 |

OTHER PUBLICATIONS

Collman et al., *Electrode Catalysis of the Four-Electron Reduction of Oxygen to Water by Dicobalt Face-to-Face Porphyrins,* J. Am. Chem. Soc. 102: 6027-6036 (1980).

Jahnke et al., *Organic Dyestuffs as Catalysts for Fuel Cells,* Topics in Current Chemistry 61: 133-181 (1976).

Yuasa, *Reduction in Molecular Oxygen of Macromolecule-metalloporphyrin Complexes,* Journal of Oleo Science 49(4): 315-323 (2000).

Barton et al., "The Adsorption of Water Vapor by Porous Carbon", 1991, *Carbon* vol. 29, No. 8, pp. 1099-1105.

Carrott, P.J.M., "Adsorption of Water Vapor by Non-Porous Carbons", 1992, *Carbon* vol. 30, No. 2, pp. 201-205.

* cited by examiner

FUEL CELL AND FUEL CELL USE GAS DIFFUSION ELECTRODE

CROSS REFERENCE TO RELATED APPLICATIONS

This application is the National Phase of PCT International Application No. PCT/JP2005/008255, filed on Apr. 22, 2005, which claims priority under 35 U.S.C. 119(a) to Japanese Patent Application Nos. 2004-126538 filed on Apr. 22, 2004; 2004-304083 filed on Oct. 19, 2004; 2004-340481 filed on Nov. 25, 2004; 2004-342296 filed on Nov. 26, 2004; 2004-345627 filed on Nov. 30, 2004, and 2005-118370 filed on Apr. 15, 2005, all of which are hereby expressly incorporated by reference into the present application.

TECHNICAL FIELD

The present invention relates to a fuel cell, more particularly relates to an electrode improved in the mobility of substances in the catalyst layer and raised in the effective rate of utilization of the catalyst ingredient so as to lower the cost and obtain superior output characteristics and to a fuel cell using such an electrode.

BACKGROUND ART

Taking as an example the structure of a general solid polymer type fuel cell, the electrode structure is basically one comprised of a polymer electrolyte film sandwiched on one side by a catalyst layer forming a cathode and on the other side by one forming an anode both bonded to the same. Further, these are sandwiched at their two sides by hydrophobic carbon paper etc. in contact with them as gas diffusion layers.

To take out current from a fuel cell of this basic structure, the cathode side is supplied with oxygen or air or another oxidizing gas while the anode side is supplied with hydrogen or another reducing gas from the outside through the gas diffusion layers. For example, when utilizing hydrogen gas and oxygen gas, the energy difference between the chemical reaction $H_2 \rightarrow 2H^+ + 2e^-$ ($E_0=0V$) occurring on the catalyst of the anode and the chemical reaction $O_2 + 4H^+ + 4e^- \rightarrow 2H_2O$ ($E_0=1.23V$) occurring on the catalyst of the cathode is utilized to take out current.

For this reason, gas diffusion paths able to supply oxygen gas or hydrogen gas to the catalysts inside the catalyst layers and proton conduction paths and electron conduction paths able to conduct protons and electrons generated on the anode catalyst to the catalyst of the cathode have to run without breakage through at least the catalyst layer or else current cannot be taken out.

As the catalyst suitable for this purpose, a catalyst of a structure using a carbon material, which is high in chemical stability and a good electron conductor, as carrier and carrying a catalyst ingredient on it is generally used.

By using this catalyst and proton conduction material to form a catalyst layer and forming networks of gas diffusion paths comprised of pores formed by the voids of the materials, proton conduction paths comprised of electrolytic materials, and electron conduction paths comprised of the carbon material, it becomes possible to realize the function of a so-called "gas electrode".

In particular, for the proton conduction paths, a polymer electrolytic material comprised of a perfluorosulfonic acid polymer or a styrene divinyl benzene-sulfonic acid or other ion exchange resin is used. These generally used ion exchange resins exhibit a high proton conductivity only under a wet environment and end up dropping in proton conductivity under a dry environment.

This is believed to be because proton mobility requires the intervention or accompaniment of water molecules. Therefore, to enable a fuel cell to work efficiently, the electrolytic material has to constantly be in a wet state and water vapor has to be constantly supplied together with the gas supplied to the two electrodes.

In general, to supply water to the electrolytic material, the method is employed of wetting the gas supplied to the cell and operating the cell under the condensation point. According to this method, the water vapor supplied into the cell partially condenses and forms drops of condensed water.

Further, the above-mentioned cathode reaction produces water on the cathode catalyst. While depending on the operating conditions of the cell, the water produced as a result of the water vapor in the catalyst layer becoming supersaturated and condensing to form drops of condensed water.

The drops formed by the condensation of the water produced by these reactions or by the condensation of water vapor supplied for wetting in the catalyst layer block the gas diffusion paths. This phenomenon is called "flooding" and is remarkable in a cathode producing a large amount of water at the time of discharge of a large current and invites a sharp drop in the voltage.

In this way, to stably operate a fuel cell, it is necessary to satisfy the contradictory requirements of sufficiently wetting the inside of the catalyst layer and quickly discharging condensed water out from the system. For this purpose, in the past, it has been proposed to use PTFE or a silane coupling agent etc. to make the inside of the catalyst layer hydrophobic.

Japanese Patent Publication (A) No. 5-36418 proposes to introduce PTFE powder, Japanese Patent Publication (A) No. 4-264367 PTFE colloid, Japanese Patent Publication (A) No. 7-183035 carbon powder made hydrophobic by PTFE, and Japanese Patent Publication (A) No. 2000-243404 carbon material made hydrophobic by a silane coupling agent, into the catalyst layer so as to increase the hydrophobicity of the inside of the catalyst layer and enable condensed water to be quickly discharged out of the system.

Further, from the viewpoint of realizing practical fuel cells, reduction of cost becomes an important issue. In general, platinum is used for the electrode catalysts of both the anode and cathode of a solid polymer type fuel cell.

Platinum is the metal with the highest activity with respect to the oxygen reduction reaction and hydrogen oxidation reaction in a sulfonic acid-based proton conduction resin or other acidic electrolyte. Further, platinum is the most suitable catalyst material from the viewpoint of the stability as a metal.

Therefore, to reduce the cost, how far the amount of use of platinum can be reduced is an important issue.

As a method for improving the efficiency of utilization of the electrode catalysts and reducing the amount of use of platinum, the following specific technology for improvement has been proposed.

Japanese Patent Publication (A) No. 9-167622 describes a method of using carbon black having pores of a diameter of 8 nm or less accounting for 0.5 cm³/g or less of the volume as a carrier and carrying a precious metal on it to control the adsorption of catalyst metal particles at carrier pores where the polymer electrolyte serving as the path of movement of the protons cannot reach.

Further, Japanese Patent Publication (A) No. 2000-100448 describes using carbon black having pores of a diameter of 6 nm or less accounting for 20% or less of the overall pores.

As the method for improving the diffusion ability of reaction gas to an electrode catalyst surface, for example, Japanese Patent Publication (A) No. 2003-201417 describes using carbon black having a specific surface area as measured by the BET method of 250 to 400 $m^2/g$, a particle size of 10 to 17 nm, and a total volume of pores opening to the surface and having a radius of 10 to 30 nm of 0.40 to 2.3 $cm^3/g$ as a catalyst carrier.

Japanese Patent Publication (A) No. 2004-82007 proposes improving the catalyst performance utilizing the relief shapes of a carrier surface.

That is, by using a carbon carrier selectively exposing the edges of a carbon net surface formed by a graphene sheet as the inside walls of pores to control the average pore size to 0.5 to 5.0 nm and carrying catalyst fine particles at the pore parts, the contact area between the carrier and the catalyst metal is increased. As a result, the catalyst activity of the catalyst metal itself is enhanced. Not only this, but also since the catalyst fine particles are carried at the pores, the so-called sintering phenomenon can be suppressed.

Further, the edge parts of the carbon net surface are preferably given —COOH, —OH, or other oxygen-containing functional groups, these oxygen functional groups result in stronger bonds between the Pt and other fine particles of catalyst metal and the carbon carrier and in improved catalyst activity.

While measures are being taken to reduce costs by the effective utilization of platinum as explained above, catalysts able to replace the basic cause of the high costs, that is, the platinum, are being energetically researched.

Among these, as a catalyst having an oxygen reduction ability, in the past, polyporphyrin, phthalocyanine, dibenzotetraazaannulene, and another complexes of large ring compounds containing a metal have been studied (H. Jahnke, M. Schonborn, G. Zimmermann, *Topics in Current Chemistry*, Vol. 61, p. 133 to 181 (1976)).

These metal complexes are known as mediators of oxygen in the body, that is, the basic idea is to utilize the ability to adsorb oxygen molecules for a reduction reaction on the electrochemical oxygen molecules (Yuasa, Makoto, *Journal of the Japan Oil Chemistry Society*, vol. 49, no. 4, p. 315 to 323 (2000)).

At the start of the research, the focus of the study was on the practical use for a catalyst for an oxygen electrode of a phosphoric acid type fuel cell, but problems remain such as the deterioration of the catalyst due to the phosphoric acid and the lower catalyst activity compared with platinum. Use for a phosphoric acid type fuel cell has still not been achieved.

On the other hand, in the case of a polymer solid electrolyte type fuel cell, it is believed that deterioration of the catalyst under an acidic environment can be avoided, so in recent years new energetic research has been under way.

To use these metal complexes as catalysts for practical electrodes, it is essential to immobilize the catalyst at an electron conductor. An oxygen carrier is used for this.

Specifically, carbon black having a high electron conductivity and a large surface area is used. Depending on the combination of this carbon carrier and metal complex, continuous use of the electrode catalyst becomes possible.

There are two problems with using a metal complex carried on a carbon carrier as an oxygen reduction catalyst: the overvoltage is larger than with a platinum catalyst and the reduction product is not only water (called a "four-electron reaction product"), but also a mixture with hydrogen peroxide (called a "two-electron reaction product").

As a means for dealing with overvoltage, heat treatment in a nonoxidizing atmosphere has been proposed (J. A. R. van Veen, et al., *J. Chem. Soc., Faraday Trans.* 1, vol. 77, p. 2827 (1981)).

However, the overvoltage improved after the heat treatment is, compared with platinum, 0.1V or more. Problems continue to remain in terms of practical use.

Further, for improvement of the yield of four-electron reaction products, binuclear complexes (Japanese Patent Publication (A) No. 11-253811, F. C. Anson, et al., *J. Am. Chem. Soc.*, Vol. 113, p. 9564 (1991)), dimerization of polyporphyrin complexes (J. P. Collman, et al., *J. Am. Chem. Soc.*, Vol. 102, p. 6027 (1980)), etc. have been proposed. However, problems remain such as the difficulties in industrial use such as with the yield in synthesis, the high cost, and the large overvoltage compared with platinum or platinum alloy.

On the other hand, the gas diffusion layers positioned at the outsides of the catalyst layers of the two electrodes are required to have the function of uniformly dispersing the gas from the gas channels formed in separators to the catalyst layers and the function of conducting electrons between the catalyst layers and separators. Various techniques have been proposed up to now for enabling efficient operation of the fuel cells.

Among these, the technique of separating the gas diffusion layer into a two-layer structure has succeeded in realizing a certain performance.

Normally, the separator side has a first layer having relatively large pore sizes stressing the diffusion ability of the gas, while the catalyst layer side has a second layer made to function as an intermediate layer for securing electron conductivity and uniformity between the coarse structure first layer and the microstructure catalyst layer.

For example, U.S. Pat. No. 5,620,807 proposes a hydrophobic gas diffusion layer having carbon particles or fiber and a fluororesin as main ingredient. As a preferred embodiment, it proposes a two-layer structure having different porosities or pore sizes.

Further, Japanese Patent Publication (A) No. 10-261421 proposes as a structure of the gas diffusion layer a two-layer structure comprised of carbon fiber cloth on the surface of which is formed a layer comprised of a fluororesin and carbon black as main ingredients.

Further, Japanese Patent Publication (A) No. 2001-57215 proposes an intermediate layer having at least two pore size distribution centers between an electrode substrate and a catalyst layer. As a preferable embodiment, it proposes two or more types of carbon particles with different particle size distributions as main ingredients.

SUMMARY OF THE INVENTION

The conventionally proposed catalyst layers using compounds such as PTFE and a silane coupling agent for splitting the electron conduction paths of the catalyst layer for the purpose of control of the hydrophobicity had problems in performance such as causing a drop in cell performance and problems such as complicated processes and use of relatively expensive compounds, so an increase in production costs.

Further, these silane coupling agents or PTFE or other hydrophobic substances have extremely high water repellencies, so the wet environment suitable for an electrolytic material could no longer be maintained inside the catalyst layers using these compounds. Therefore, the conventional catalyst layers could no longer necessarily give efficient cell characteristics.

Therefore, in the past, not only haven't there been any proposals for materials maintaining a wet environment suitable for an electrolytic material, but also no quantitative indicator has been shown for the wettability of materials for maintaining a suitable wet environment useful for design of the catalyst layers.

Technologies for improving the performance of carbon materials used for carriers of catalysts up to now have particularly focused on improvement of the gas diffusion ability by control of the porous structure of the electrodes, in particular the catalyst layers. As specific means for this, Japanese Patent Publication (A) No. 9-167622, Japanese Patent Publication (A) No. 2000-100448, and Japanese Patent Publication (A) No. 2003-201417 define the porous structure of the electrodes themselves or define the aggregate structure of the carrier carbon black-However, while improvement of the gas diffusion ability in the electrodes leads to an improvement of the output voltage in the large current density region (0.5 A/cm$^2$ or more) where mobility of substances becomes the limiting factor (overcurrent), it does not lead to an improvement in the output characteristics in the low current density region. Improvement of the output voltage in the low current density region requires improvement of the reaction activity of the catalyst itself and improvement of the rate of utilization of the catalyst.

Further, Japanese Patent Publication (A) No. 2004-82007 considers that the catalyst metal can be increased in lifetime by using a carbon carrier with depressions formed in its surface by the edge planes of graphene sheets and carrying fine particles of catalyst metal in these depressions and further considers a pore diameter of 0.5 to 5.0 nm to be the preferred range. The inventors however studied various types of activated carbon (where the walls of the pore parts are generally formed by carbon edges and the pore diameters fall in the range of 0.5 to 5.0 nm), but found these were small in effect. Commercial application requires a further increase in the catalyst life.

In the prior art for development of alternative catalysts for platinum, there has not necessarily been sufficient effort directed at the design of the molecular structure of metal complexes for catalysts based on modeling and quantum chemical simulation of the reduction reaction of oxygen molecules. As a result, no one has succeeded in development of a metal complex-based catalyst with a small reaction overvoltage able to be used for practical applications.

Therefore, the present invention has as its object to provide a catalyst layer maintaining a suitable wet environment and extremely good in proton conduction, electron conduction, and gas diffusion without splitting the electron conduction paths in the catalyst layer of a fuel cell and simultaneously provide a fuel cell optimizing the catalyst carrier, that is, the carbon material, to improve the output voltage in the high current density range and the low current density range, raising the rate of utilization of the catalyst, and using a newly discovered alternative catalyst for platinum to reduce the amount of use of precious metals, reduce the cost, and give superior output characteristics.

On the other hand, if studying the prior art relating to gas diffusion layers from the viewpoint of drawing out the maximum characteristics of a high performance catalyst layer, specifically the following problems arise. That is, U.S. Pat. No. 5,620,807 defines the preferable range of the porosity and pore size, but does not define the carbon particles or fibers used. In particular, the method of control of the pore size of the fine pore layer contacting the catalyst layer depends on the amount and molecular weight of one of the main ingredients, that is, the polymer material. Control of the pore size is difficult and is not a general practice.

Further, Japanese Patent Publication (A) No. 10-261421 proposes a multilayer structure of a two-layer structure gas diffusion layer, but like U.S. Pat. No. 5,620,807 does not define the type or structure of the preferred carbon black. It is difficult to draw out all of the performance of a catalyst layer with just the proposed content.

In particular, these U.S. Pat. No. 5,620,807 or Japanese Patent Publication (A) No. 10-261421 both propose means for securing the gas diffusion paths which depend on hydrophobic polymer materials and require the content of the insulating polymer materials to be raised in order to raise the diffusion ability of the gas and therefore easily impair the conductivity.

Further, Japanese Patent Publication (A) No. 2001-57215 proposes use of a mixture of large sized carbon particles and small sized carbon particles as the main ingredient of the gas diffusion layer contacting the catalyst layer. It refers to the structure of the carbon material used itself, but concedes that depending on the combination of the particle sizes, there are cases where conversely the gas diffusion paths are blocked. When using pores formed in the spaces between the different large sized carbon particles and small sized carbon particles as the gas diffusion paths, sometimes the cell fastening pressure causes the particles to move and the pores to be blocked. Further, along with long term use, the particles become rearranged and sometimes the pore sizes deviate from the optimum state. This therefore cannot be said to be a sufficient proposal.

Therefore, with just the conventionally proposed content, while a certain degree of performance could be obtained when connecting high performance catalyst layers to the gas diffusion layers, it was difficult to draw out the maximum performance of the catalyst layers.

Therefore, the present invention has as its object to solve the above problems and provide a gas diffusion electrode comprised of an electrode structure of a combination of a catalyst layer and gas diffusion layer sufficiently wetting the inside of the catalyst layer, quickly discharging condensed water outside of the system, not suffering from flooding even at the time of discharge of a large current, and realizing stable cell performance.

The inventors engaged in studies to solve the above problems and as a result discovered that if introducing the carbon material of the main ingredient of the catalyst layer into the catalyst layer divided into carbon material carrying the catalyst ingredient (hereinafter referred to as "catalyst-carrying carbon material") and carbon material not carrying the catalyst ingredient (hereinafter referred to as the "gas-diffusing carbon material"), it is possible to prevent the condensed water from blocking the gas diffusion paths and in particular greatly improve the cell characteristics at the time of discharge of a large current, there is an optimum range for the ratio of content of the gas-diffusing carbon material, and further there are suitable ranges of the wettability of the catalyst-carrying carbon material and gas-diffusing carbon material, etc.

Further, the inventors engaged in in-depth studies to improve the catalyst performance of the carbon material used for the catalyst carrier and as a result discovered that the pore structure of the carbon material surface, in particular the structure of micropores having a diameter of 2 nm or less, is important and that by combining the distribution of the chemical functional groups present at the carbon material surface and the 3D structure of the carbon material of the conventional indicator DBP etc., a remarkable improvement in the performance is recognized.

Further, the inventors engaged in in-depth studies of a metal complex-based catalyst for replacing a platinum catalyst and as a result discovered that in an N4-chelate-type metal complex, the O—O bond distance, based on quantum chemical simulation, of the oxygen molecules bonded with the complex center metal in the adsorption structure of the metal complex and the oxygen molecules governs the catalyst activity of the oxygen reduction reaction of the metal complex, succeeded in optimizing the molecular structure of the complex to realize an activity equal to that of platinum, and thereby, together with introducing the above-mentioned gas-diffusing carbon material and optimizing the structure of the catalyst-carrying carbon material, completed the present invention.

On the other hand, the inventors engaged in studies relating to the gas diffusion layer for the purpose of drawing out to the maximum extent the performance of the above-mentioned enhanced performance catalyst layer by uniform diffusion of the reaction gas in the catalyst layer, optimization of the wet environment of the catalyst layer, and promotion of the discharge of the generated water and as a result discovered that using a gas diffusion layer having a two-layer structure and using carbon black with suitable surface characteristics for water as the main ingredient of the micropore layer adjoining the catalyst layer and that using a material itself having a structure enabling pores of a suitable size to be formed for securing paths of movement of the gas or paths of movement of water are effective.

Further, the inventors discovered quantitative indicators for accurately selecting materials having these characteristic. That is, the inventors discovered that it is effective to arrange a micropore layer having as a main ingredient carbon black having a suitable amount of adsorption of water vapor next to the catalyst layer and to select and use for the micropore layer carbon black having a suitable structure utilizing the specific surface area found by the DBP oil absorption and nitrogen adsorption.

Further, the inventors discovered that by combining such a gas diffusion layer and the above-mentioned catalyst layer, it is possible to greatly improve the performance, and thereby completed the present invention.

That is, the present invention has as its gist the following:

(1) A fuel cell comprised of a proton conductive electrolyte film sandwiched by a pair of catalyst layers, wherein at least a catalyst layer of a cathode is comprised of a mixture of a catalyst ingredient, an electrolytic material, and a carbon material, said carbon material is comprised of a catalyst-carrying carbon material carrying said catalyst ingredient and a gas-diffusing carbon material not carrying said catalyst ingredient, and said catalyst-carrying carbon material has an amount of adsorption of water vapor at 25° C. and a relative humidity of 90% of 50 ml/g or more.

(2) A fuel cell comprised of a proton conductive electrolyte film sandwiched by a pair of catalyst layers, wherein at least a catalyst layer of a cathode is comprised of a mixture of a catalyst ingredient, an electrolytic material, and a carbon material, said carbon material is comprised of a catalyst-carrying carbon material carrying said catalyst ingredient and a gas-diffusing carbon material not carrying said catalyst ingredient, said catalyst-carrying carbon material is activated carbon, a surface area BET evaluated by BET satisfies $S_{BET} \geq 1500$ m$^2$/g, and a ratio of the surface area of micropores having a diameter of 2 nm or less, that is, S micro (m$^2$/g), to the total pore area, that is, S total (m$^2$/g), satisfies S micro/S total$\leq 0.5$.

(3) A fuel cell as set forth in (2), characterized in that said activated carbon has an average diameter of micropores having a diameter of 2 nm or less of 0.7 nm to 1.5 nm.

(4) A fuel cell as set forth in (2) or (3), characterized in that said activated carbon has an oxygen content of 5 mass % or less.

(5) A fuel cell comprised of a proton conductive electrolyte film sandwiched by a pair of catalyst layers, wherein at least a catalyst layer of a cathode is comprised of a mixture of a catalyst ingredient, an electrolytic material, and a carbon material, said carbon material is comprised of a catalyst-carrying carbon material carrying said catalyst ingredient and a gas-diffusing carbon material not carrying said catalyst ingredient, said catalyst-carrying carbon material has a volume of micropore having a diameter of 2 nm or less of 0.1 ml/g or more, and said catalyst-carrying carbon material has a DBP oil absorption of 300 ml/100 g or more.

(6) A fuel cell as set forth in (5), characterized in that said catalyst-carrying carbon material has a specific surface area SBET by the BET method of 500 m$^2$/g or more.

(7) A fuel cell as set forth in any one of (1) to (6), characterized in that said gas-diffusing carbon material is included in the catalyst layer in an amount of 5 mass % to 50 mass %.

(8) A fuel cell as set forth in any one of (1) to (7), characterized in that said gas-diffusing carbon material has an amount of adsorption of water vapor at 25° C. and a relative humidity of 90% of 100 ml/g or less.

(9) A fuel cell as set forth in any one of (1) to (8), characterized in that said gas-diffusing carbon material has an amount of adsorption of water vapor at 25° C. and a relative humidity of 90% of 1 ml/g to 50 ml/g.

(10) A fuel cell as set forth in any one of (1) to (9), characterized in that said catalyst ingredient contains an N4-chelate-type metal complex.

(11) A fuel cell as set forth in (10), characterized in that said metal complex is a N4-chelate-type complex structure and two or more of the N atoms bonded with the center metal are imine types.

(12) A fuel cell as set forth in (10) or (11), characterized in that said metal complex has an O—O bond distance of oxygen molecules bonded with the complex center metal in an adsorption structure of a metal complex and oxygen molecules calculated by the B3LYP density function method of 0.131 nm or more.

(13) A fuel cell as set forth in (12), characterized in that said N4-chelate-type metal complex is one or both of the following general formula 1 or general formula 2.

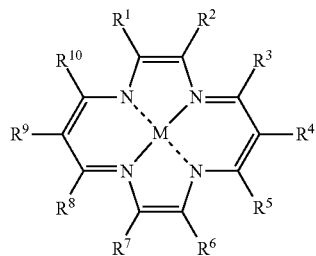

(general formula 1)

(wherein, M is a metal atom, and each of $R^1$ to $R^{10}$ is hydrogen or a substituent group)

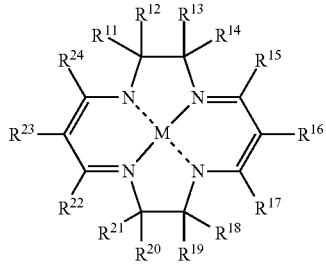

(general formula 2)

(wherein, M is a metal atom, and each of $R^{11}$ to $R^{24}$ is hydrogen or a substituent group)

(14) A fuel cell as set forth in any one of (10) to (13), characterized in that said metal complex has a complex center metal of one or more types of metal selected from the transition metals of Group V, Group VI, Group VII, or Group VIII of the Periodic Table.

(15) A fuel cell as set forth in any one of (10) to (14), characterized by further containing as said catalyst ingredient a precious metal.

(16) A fuel cell use gas diffusion electrode is comprised of at least a catalyst layer of a cathode of a fuel cell of any of the above-mentioned (1) to (15), a micropore layer having as its main ingredient carbon black formed at an opposite side to a surface of said catalyst layer containing a proton conductive electrolyte film, and a gas diffusion fiber layer having as its main ingredient a fibrous carbon material formed on said micropore layer, said gas diffusion electrode characterized in that
the carbon black of said micropore layer has an amount of adsorption of water vapor at 25° C. and a relative humidity of 90% of 100 ml/g or less.

(17) A fuel cell use gas diffusion electrode as set forth in (16), characterized in that the main ingredient carbon black of said micropore layer has a ratio X/Y of a DBP oil absorption X ml/100 g and a nitrogen adsorption specific area $Y m^2/g$ of 1 or more.

A fuel cell using the catalyst layer defined in the present invention for at least the cathode is excellent in gas diffusion, electron conduction, proton conduction, and wetness management in the catalyst layer and is raised in rate of utilization of the catalyst ingredient, so it enables provision of a fuel cell achieving both reduction of the amount of platinum or other precious metal used for the catalyst, that is, a reduction of cost, and an improvement in the output characteristics.

Further, according to the present invention, since the characteristics of the carbon black used in the gas diffusion layer are suitable, the inside of the catalyst layer can be sufficiently wetted, blocking of the gas diffusion paths by the drops of water produced becomes difficult, and higher output characteristics can be expressed.

THE MOST PREFERRED EMBODIMENT

The electrode structure included in the fuel cell of the present invention is comprised of a catalyst layer and a gas diffusion layer. The catalyst layer is comprised of a mixture of a catalyst ingredient, carbon material, and electrolytic material, while the carbon material is comprised of a catalyst-carrying carbon material carrying the catalyst ingredient and a gas-diffusing carbon material not carrying the catalyst ingredient. The gas diffusion layer is comprised of a micropore layer having carbon black as its main ingredient at the surface contacting the catalyst layer and a gas diffusion fiber layer having a fibrous carbon material as its main ingredient at the surface of the micropore layer opposite to the catalyst layer.

Below, the configuration of the catalyst layer of the present invention and a gas diffusion electrode combining a gas diffusion layer and such a catalyst layer will be explained in detail.

The catalyst layer of the fuel cell in the present invention is characterized by enabling remarkably improved fuel cell performance as a synergistic effect of the following three design features:

That is, (1) as a component of the catalyst layer, in addition to the carbon material carrying the catalyst and the electrolytic material, a carbon material not carrying the catalyst is newly added so as to assist gas diffusion, the flow of water, and other mobility of substances and simultaneously to "positively control the wet environment" by the hydrophobicity of the carbon material, (2) the pores and other "surface structures of the catalyst-carrying carbon material are optimized" to raise the rate of utilization of the catalyst, and (3) a transition metal complex of an N4-chelate structure is used as the catalyst ingredient and the O—O bond distance, based on quantum chemical simulation, of the oxygen molecules bonded with the complex center metal in the adsorption structure of the metal complex and oxygen molecules is optimized to successfully raise the catalyst activity of the metal complex in an oxygen reduction reaction to a level equal to that of platinum and thereby greatly reduce the amount of use of platinum.

Below, the above three design features will be explained in further detail.

<Control of Wet Environment of Catalyst Layer>

The type of the carbon material used in the catalyst layer included in the fuel cell of the present invention is not particularly limited so long as it is a generally available carbon material having electron conductivity. It is preferably not a material which undergoes chemical reactions other than the inherently sought reaction or elutes substances forming the carbon material due to contact with condensed water. A chemically stable carbon material is preferred.

Further, the carbon material preferably has a primary particle size of 1 μm or less. A carbon material with particle sizes larger than this may be crushed for use. If the primary particle size is over 1 μm, the possibility of the gas diffusion paths or proton conduction paths being split rises and, also, the distribution of the carbon material in the catalyst layer easily becomes uneven, so this is not preferable.

As a preferred carbon material, carbon black is the most general, but it is also possible to use various crystalline carbon materials obtained by carbonizing or graphitizing various materials, graphite materials, carbon fibers, etc. and their crushed forms, carbon nanofibers, carbon tubes, and other carbon compounds etc. Further, it is also possible to use two or more types of these.

The carbon material constituting one main ingredient of the catalyst layer included in the fuel cell of the present invention may be divided into a catalyst-carrying carbon material and gas-diffusing carbon material.

By including a carbon material not carrying the catalyst ingredient, that is, the gas-diffusing carbon material, in the catalyst layer, it is possible to promote formation of paths for diffusion of gas in the catalyst layer. In the case of an anode, hydrogen or a mixed gas mainly comprised of hydrogen and, in the case of a cathode, oxygen or air etc. can therefore easily diffuse in the catalyst layer and contact a greater surface area of the catalyst.

Therefore, the reaction at the catalyst layer can be efficiently promoted and a high cell performance can be obtained.

The catalyst-carrying carbon material used for the catalyst layer of the present invention is not limited in type of catalyst ingredient or carbon material so long as the carbon material can carry a catalyst ingredient effective for the type of the gas supplied and has a good electron conductivity.

As examples of the catalyst ingredient, platinum, palladium, ruthenium, gold, rhodium, osmium, iridium, and other precious metals, complexes or alloys of precious metals combining two or more types of these precious metals, complexes of precious metals with organic compounds or inorganic compounds, transition metals, complexes of transition metals with organic compounds or inorganic compounds, metal oxides, etc. may be mentioned. Further, it is possible to use a complex of two or more types of these.

As examples of the catalyst-carrying carbon material, carbon black is the most general, but it is also possible to use various crystalline carbon materials obtained by carbonizing or graphitizing various materials, graphite materials, carbon fibers, etc. and their crushed forms, carbon nano-fibers, carbon tubes, and other carbon compounds etc. Further, it is also possible to use two or more types of these.

The preferred content of the catalyst-carrying carbon material in the catalyst layer is affected by the type and content of the catalyst-carrying carbon material and gas-diffusing carbon material and the type and carrying rate of the catalyst ingredient, so cannot be specified. If in a range of 5 mass % to 80 mass %, at least the fuel cell can function and the effect of the present invention can be obtained.

If illustrating a more preferable range, this would be 10 mass % to 60 mass %. If outside this range, the balance with the other main ingredients will become poor and an efficient fuel cell cannot be obtained. For example, if less than 5 mass %, the amount of the catalyst ingredient carried by the catalyst-carrying carbon material will become too small. Further, for example, if over 80 mass %, the amount of the electrolytic material will become too small and the conduction paths of the protons will become poor, so again an efficient fuel cell cannot be obtained.

Further, if the catalyst-carrying carbon material has an amount of adsorption of water vapor at 25° C. and a relative humidity of 90% of 50 ml/g or more, the electrolyte in the vicinity of the catalyst ingredient can be kept in a suitable wet state and a drop in proton conductivity can be prevented, so even at the time of low current density discharge when not much water is formed on the catalyst ingredient of the cathode, the resistance to proton conduction will not rise and the fuel cell can be kept in a preferred state.

Further, this catalyst-carrying carbon material is preferred since the generally carried catalyst ingredient can be easily made finer and the reaction surface area can be increased even with a small amount of the catalyst ingredient. Therefore, the more the catalyst-carrying carbon material can be wet by water the better. No upper limit can be set for the preferred range of the amount of adsorption of water vapor at 25° C. and a relative humidity of 90%.

However, in so far as using a carbon material for the catalyst carrier, there should be a limit to the amount which can adsorb water vapor. If illustrating a substantive upper limit value for the amount of adsorption of water vapor at 25° C. and a relative humidity of 90%, then 1500 ml/g obtained by activated carbon with a high specific surface area may be mentioned.

If the amount of adsorption of water vapor at a relative humidity of 90% is lower than 50 ml/g, the electrolyte near the catalyst ingredient easily dries up and the proton conductivity easily falls, so this is not preferable. Further, the carried catalyst ingredient also tends to generally become larger in particle size, so a large amount of the catalyst ingredient is required for obtaining a sufficient cell performance, therefore this is not preferable.

The amount of adsorption of water vapor at 25° C. and a relative humidity of 90% used as an indicator in the present invention shows the amount of water vapor adsorbed per 1 g of carbon material placed in a 25° C. environment converted to the volume of water vapor in the standard state. The amount of adsorption of water vapor at 25° C. and a relative humidity of 90% can be measured using a commercially available water vapor adsorption measuring device. Alternatively, it is possible to allow a dried gas-diffusing carbon material to stand in a constant temperature, constant humidity tank of a temperature of 25° C. and a relative humidity of 90% for a sufficient time and measure the change in mass.

The content, in the catalyst, of the gas-diffusing carbon material used for the catalyst layer of the present invention is more preferably 5 mass % to 50 mass % in range. If less than 5 mass %, the gas diffusion paths cannot be sufficiently enlarged and the effect of inclusion of the gas-diffusing carbon material becomes unclear. If over 50 mass %, the proton conduction paths become poor and the IR drop becomes large, so the cell performance falls.

While depending on the type and form of the carbon material, 10 mass % to 35 mass % is most preferred. If in this range, it is possible to promote the formation of the gas diffusion paths without detracting from the proton conduction paths and the electron conduction paths.

In particular, this effect becomes remarkable with an amount of adsorption of water vapor at 25° C. and a relative humidity of 90% of the gas-diffusing carbon material of 100 ml/g or less.

If the amount of adsorption of water vapor at 25° C. and a relative humidity of 90% of the gas-diffusing carbon material is 100 ml/g or less, it is possible to further suppress blockage of the gas diffusion paths by the water produced at the time of large current discharge and current can be taken out by a stable voltage. If over 100 ml/g, condensed water builds up in the catalyst layer at the time of current discharge, the gas diffusion paths are easily blocked, and the voltage behavior easily becomes unstable.

To obtain a further higher effect, a gas-diffusing carbon material having a suitable range of surface wettability is used. Specifically, a carbon material having an amount of adsorption of water vapor at 25° C. and a relative humidity of 90% of 1 ml/g to 50 ml/g is selected as the gas-diffusing carbon material.

If in this range, even at the time of low current density discharge when the amount of water produced inside the cathode is small, the drying out of the electrolytic material in the cathode can be prevented and a good wet state can be maintained. Further, even at the time of large current discharge, the water produced inside the catalyst layer can be efficiently discharged outside of the catalyst layer and the gas diffusion paths can be secured, so a cell which is good in efficiency across the entire range from low load to high load without regard as to the load conditions can be obtained.

Further, if carbon materials having an amount of adsorption of water vapor at 25° C. and a relative humidity of 90% of 1 ml/g to 50 ml/g, two or more types of carbon material can be mixed for use as the gas-diffusing carbon material.

If the amount of adsorption of water vapor at 25° C. and a relative humidity of 90% is less than 1 ml/g, the hydrophobicity will become too strong. In particular, at the time of low current discharge, it will be harder to maintain the electrolytic material copresent in the catalyst layer in a suitable wet state and the proton conductivity is liable to fall, so the effect of addition of the gas-diffusing carbon material will become lower.

If the amount of adsorption of water vapor at 25° C. and a relative humidity of 90% is over 50 ml/g, when continuously taking out a large current etc., the water produced inside the catalyst layer will not be able to be discharged fast enough and the gas diffusion paths are liable to end up being blocked, so the effect of adding the gas-diffusing carbon material will become lower.

The wettability of the carbon material included in the fuel cell of the present invention, that is, the gas-diffusing carbon material and the catalyst-carrying carbon material wettability, can be controlled by selecting from the generally available carbon materials using the amount of adsorption of water vapor as an indicator. Alternatively, even in the case of a carbon material having an amount of adsorption of water vapor lower than the preferred range, the carbon material may be treated at the surface of the carbon material by an acid or base etc. or exposed to an oxidizing atmosphere environment so as to increase the amount of adsorption of water vapor to the preferred range.

While not limited to this, for example, it is possible to treat the material in warmed concentrated nitric acid, immerse it in a hydrogen peroxide aqueous solution, heat treat it in an ammonia stream, immerse it in a warmed sodium hydroxide aqueous solution, or heat treat it in dilute oxygen or dilute NO or $NO_2$ so as to increase the amount of adsorption of water vapor.

Conversely, if the amount of adsorption of water vapor is too great, it is possible to fire the material in an inert atmosphere to lower the amount of adsorption of water vapor to the preferred range. While not limited to this, it is possible to heat treat the material in an atmosphere of argon, nitrogen, helium, vacuum, etc. to reduce the amount of adsorption of water vapor.

The catalyst layer included in the fuel cell of the present invention exhibits its effect without regard as to the type or form of the electrolyte film and the electrolytic material used and is not particularly limited in these.

The fuel cell where the catalyst layer included in the fuel cell of the present invention exhibits its greatest effect is a fuel cell operating under conditions where water easily condenses in the catalyst layer, for example, a solid polymer type fuel cell etc. The effect of the catalyst layer of the present invention does not depend on the type or form of the electrolyte or the operating temperature etc.

As the electrolyte film used for the fuel cell of the present invention or the electrolytic material used for the catalyst layer, a polymer in which a phosphoric acid group, sulfonic acid group, etc. is introduced, for example, a perfluorosulfonic acid polymer or a polymer in which benzenesulfonic acid is introduced etc. may be mentioned, but the invention is not limited to these polymers. It is also possible to use an inorganic, inorganic-organic hybrid, or other proton conductive electrolyte film for the fuel cell.

If illustrating a preferred range of operating temperature, a fuel cell operating in the range from ordinary temperature to 150° C. is preferred.

Further, the mass ratio of the catalyst-carrying carbon material and the electrolytic material in the catalyst layer is preferably 1/5 to 5/1. If the catalyst-carrying carbon material is less than 1/5, the catalyst surface ends up excessively covered by the electrolytic material and the area by which the reaction gas can contact the catalyst ingredient becomes smaller, so this is not preferred. Further, if the catalyst-carrying carbon material is included in excess over 5/1, the network of the electrolytic material becomes weak and the proton conductivity becomes lower, so this is not preferable.

The method of preparation of the catalyst layer included in the fuel cell of the present invention is not particularly limited. For example, it is possible to mix the catalyst-carrying carbon material and gas-diffusing carbon material, add to this a solution containing a perfluorosulfonic acid polymer or other such electrolyte dissolved or dispersed in it, and add water or an organic solvent as needed to prepare an ink. This ink can be dried in a film state and be used as a catalyst layer.

However, for the catalyst layer included in the fuel cell of the present invention to effectively function, it is preferable to select a method of preparation where the electrolytic material is kept from contacting the surface of the gas-diffusing carbon material as much as possible. Particularly preferred methods of preparing a catalyst layer will be explained below.

A) A catalyst-carrying carbon material carrying a catalyst and an electrolytic material are crushed and mixed in a good solvent of the electrolytic material, then a weak solvent of the electrolytic material is added and the electrolytic material and the catalyst-carrying carbon material carrying the catalyst are made to heterocoagulate to obtain a solution A. A gas-diffusing carbon material not carrying the catalyst ingredient is crushed in a weak solvent of the electrolytic material to obtain a solution B. The solution A and the solution B are mixed to obtain a solution C which is then dried in a film state to obtain a catalyst layer.

With this method, if crushing and mixing the catalyst-carrying carbon material carrying a catalyst together with the electrolytic material in a good solvent of the electrolytic material, the large coagulate of the catalyst-carrying carbon material carrying the catalyst is crushed to fine coagulates and the electrolytic material is dissolved and remains present near the surface.

If adding a weak solvent of the electrolytic material to this and causing the electrolytic material to coagulate, the catalyst-carrying carbon material carrying the catalyst and the electrolytic material particles heterocoagulate and the electrolytic material is immobilized at the catalyst-carrying carbon material carrying the catalyst.

Further, if fine gas-diffusing carbon material is added to this solution, since the electrolytic material is immobilized at the catalyst-carrying carbon material carrying the catalyst, the surface of the gas-diffusing carbon material is resistant to being covered by the electrolytic material and the surface properties inherently possessed by the surface of the gas-diffusing carbon material can be put to good use.

This method is particularly effective when using a gas-diffusing carbon material controlling the wettability of the surface.

B) A catalyst-carrying carbon material carrying a catalyst and a fine amount of electrolytic material are crushed and mixed in a good solvent of an electrolytic material, then dried to a solid. A weak solvent of the electrolytic material is added to this, then the solid is crushed, then a solution in which the electrolytic material is dissolved is dropped into it to obtain a solution A. A gas-diffusing carbon material not carrying the catalyst ingredient is crushed in a weak solvent of the electrolytic material to obtain a solution B. The solution A and the solution B are mixed to obtain a solution C which is dried in a film state to obtain a catalyst layer.

With this method as well, if crushing and mixing the catalyst-carrying carbon material carrying a catalyst together with a fine amount of electrolytic material in a good solvent of the electrolytic material, then drying the mixture, the fine amount of electrolytic material is immobilized in a film state on the surface of the catalyst-carrying carbon material carrying the catalyst surface.

If crushing this in a weak solvent of the electrolytic material, the electrolytic material is reduced to fine particles while remaining immobilized on the catalyst-carrying carbon material carrying the catalyst.

Further, a necessary and sufficient electrolyte solution is added to this dropwise, whereby the electrolytic material and the catalyst-carrying carbon material at which a slight amount of the electrolytic material is immobilized coagulate to form a dispersion.

If adding a fine gas-diffusing carbon material to this, in the same way as the method of A), since the electrolytic material is immobilized or coagulated at the surface of the catalyst-carrying carbon material carrying the catalyst, the surface of the gas-diffusing carbon material is resistant to being covered by the electrolytic material and the surface properties inherently possessed by the surface of the gas-diffusing carbon material can be put to good use.

This method is also effective for the case of use of a gas-diffusing carbon material controlled in surface wettability.

The "good solvent of an electrolytic material" used in these methods of preparation of a catalyst layer means a solvent which substantially dissolves the used electrolytic material. It depends on the type and molecular weight of the electrolytic material, so cannot be limited.

Illustrating specific examples, as good solvents for the perfluorosulfonic acid polymer included in the commercially available 5%-Nafion solution made by Aldrich, methanol, ethanol, isopropyl alcohol, etc. may be mentioned.

Further, the "weak solvent of an electrolytic material" used in these methods of preparation of a catalyst layer means a solvent which substantially does not dissolve the used electrolytic material. The solvent differs depending on the type and molecular weight of the electrolytic material, so cannot be specified.

For example, if illustrating weak solvents for the perfluorosulfonic acid polymer included in the commercially available 5%-Nafion solution made by Aldrich, hexane, toluene, hexene, ethyl acetate, butyl acetate, etc. may be mentioned.

The method of crushing or crushing and mixing the material in the preferred methods of preparation of a catalyst layer of the above-mentioned A) and B) is not limited in means so long as it can fulfill the object of crushing the catalyst-carrying carbon material or gas-diffusing carbon material formed into a large coagulate and crush it to coagulates of 1 μm or less in size.

As general methods, if illustrating examples, the method of using ultrasonic waves, the method or using a ball mill or glass beads etc. for mechanical crushing may be mentioned.

When drying the ink in a film state, the generally proposed methods can be applied, but the method is not particularly limited, but for example the method of coating and drying the ink on a gas diffusion layer comprised of carbon paper, then bonding it on an electrolyte film such as a perfluorosulfonic acid polymer by a hot press etc., a method of coating, then drying the ink on an electrolyte film such as a perfluorosulfonic acid polymer, the method of coating it once on a Teflon sheet etc., then drying it and transferring the result to an electrolyte film such as a perfluorosulfonic acid polymer by a hot press etc., etc. may be mentioned.

<Application of Activated Carbon for Catalyst-Carrying Carbon Material>

The inventors engaged in in-depth studies and as a result discovered that activated carbon controlled in surface structure exhibits superior characteristics as a catalyst-carrying carbon material and thereby completed the present invention.

There inherent effects of use of activated carbon for the catalyst carrier can be seen in the following two points:

1. The effect of high density introduction of adsorption sites for carrying fine particles of catalyst metal on the carrier surface.

2. The effect of raising the affinity between the carrier surface and the polymer electrolyte to increase the amount of adsorption of the polymer electrolyte.

The above-mentioned effects can be expected to result in the following specific improvements in performance: That is, the 1. increase in adsorption sites can be expected to enable the particles of the catalyst metal to be made finer and the higher density carrying of fine particles by the catalyst metal. The adsorption sites are observed as pores on the surface of the activated carbon.

When adding an aqueous solution of a precursor compound of the catalyst metal (for example, hydrogen hexachloroplatinate) and an aqueous solution of a reducing agent (for example, potassium borohydride) to the water in which the carbon carrier is dispersed so as to simultaneously promote the reduction of the precursor and carrying on the carrier, the particle size of the carried metal fine particles is determined by the probability of adsorption at the carrier and the competitive reaction of particle growth.

This probability of adsorption is governed by the surface density of the adsorption sites on the surface of the carrier. Fine particles of catalyst metal reduced by a high surface density are adsorbed in a state of a smaller particle size.

Further, if the surface density of the adsorption sites is high, when carrying fine particles of catalyst metal at a high density, it is possible to have other fine particles of catalyst be adsorbed and combined over the fine particles of catalyst already adsorbed to thereby reduce the probability of the particles becoming coarser and as a result possible to carry fine particles of fine catalyst metal.

By making the catalyst metal into fine particles, the area per unit mass of the catalyst metal increases. As a result, with the same mass of the catalyst metal mass, the effective catalyst reaction area increases, so the output voltage of the electrode rises. Alternatively, to obtain the same output voltage, it is possible to reduce the mass of the catalyst metal required.

Further, if it is possible to carry the fine particles of the catalyst metal at a high density, that is, raise the carrying (mass) rate of the catalyst metal, it becomes possible to reduce the thickness of the catalyst layers with the same catalyst metal mass by that extent.

Reduction of the catalyst layer to a thin film leads to a shorter distance of gas diffusion paths, that is, reduced resistance to mobility of substances, and as a result can reduce the resistance to mobility of substances in the electrode reaction.

On the other hand, if it is possible to 2. raise the affinity of the carrier surface and polymer electrolyte, the ratio of contact between the fine particles of catalyst metal carried on the carrier and the electrolyte polymer rises, that is, the effective surface area of the catalyst reaction can be increased.

Due to this, if the same mass of the catalyst metal, the effective catalyst reaction area increases, so the output voltage of the electrode rises. Alternatively, it is possible to reduce the mass of the catalyst metal necessary for obtaining the same output voltage.

The inventors engaged in indepth studies on indicators defining the surface structure of activated carbon optimum for obtaining the above-mentioned effects of a catalyst carrier and learned that the following indicators were optimum. That is, indicators such as the specific surface area (total specific surface area), the specific surface area of micropores defined as pores of a diameter of 2 nm or less, the average diameter of micropores, the oxygen content, and the DBP oil absorption are optimum.

Basically, in order for a carbon carrier to carry fine particles of the catalyst metal at a high density, a certain extent or more of a large specific surface area is required. Expressing this specifically, SBET≥1500 m$^2$/g. Here, SBET is the specific surface area value found by the BET method from measurement of the isotherm adsorption line at the liquid nitrogen temperature of the nitrogen gas.

If the SBET is less than 1500 m$^2$/g, in general it is difficult to "carry fine particles of catalyst metal having a diameter of 3 nm or less at 50 mass % or more" required for high performance catalysts. More preferably, SBET≥1600 m$^2$/g. The upper limit of the specific surface area is not particularly limited, but the specific surface area of the carbon material is actually 4000 m$^2$/g or less.

In general, the smallest particle size where the catalyst activity of the bulk metal is maintained and the specific activity per unit mass becomes the greatest is said to be a diameter of 1 to 3 nm. Such sizes of adsorption sites of catalyst metal are believed to be given by micropores, so the majority of the specific surface area has to be by micropores.

Expressing this specifically, the ratio of surface area Smicro (m$^2$/g) of micropores having a diameter of 2 nm or less to the total pore area Stotal (m$^2$/g) is S micro/S total≥0.5. More preferably, Smicro/Stotal≥0.6, further preferably, Smicro/Stotal≥0.7.

Further, the surface area of the micropore cannot exceed the total surface area, so Smicro/Stotal≤1. If Smicro/Stotal<0.5, the density of the adsorption sites is low and the catalyst cannot be reduced to fine particles, so this is not suitable for high density carrying of fine particles of catalyst metal.

To obtain the adsorption sites for the fine particles of catalyst metal carried to be carried efficiently at a size of 1 to 3 nm as explained above, it is necessary to define the diameter of the pores of the activated carbon. The inventors engaged in indepth studies and as a result discovered that the average diameter of the micropores is preferably 0.7 nm to 1.5 nm, more preferably, 0.8 nm to 1.4 nm. If less than 0.7 nm, the pore size is too small, so the function of adsorption sites for 1 to 3 nm fine particles of catalyst metal ends up being lost and fine particles of catalyst metal cannot be carried.

Further, with micropores of an average diameter over 1.5 nm, the fine particles of catalyst metal end up being buried in the pores and the surface area effective for the reaction ends up being reduced. This is therefore not suited to the present invention.

Note that the specific surface area (total specific surface area), the specific surface area of micropores defined as pores of a diameter of 2 nm or less, and the average diameter of micropores are all calculated from the isotherm adsorption of nitrogen gas at the liquid nitrogen temperature. For the average diameter of the micropores, the value calculated by 2×V micro/S micro was used.

This is calculated assuming the distance between slits when envisioning slit-shaped pores to be the diameter of the pores. For Smicro, Stotal, and Vmicro, the values calculated by t-plot analysis (Chemical Society of Japan ed., *Colloid Chemistry I*, Tokyo Kagaku Dojin Co., Ltd., 1995) were used.

In general, activated carbon includes oxygen introduced in various chemical forms at the pore surface of the activated carbon in accordance with the method of production. For example, carboxyl groups, hydroxy groups, xenon-type oxygen, lactone rings, ring-shaped ether, etc. may be mentioned.

The inventors engaged in in-depth studies and as a result learned that if the oxygen content is too great, the contact resistance between the catalyst particles becomes larger, so the ohmic resistance when forming the catalyst layer increases and therefore the output voltage falls.

The range of the optimum oxygen content is 5 mass % or less, more preferably 4 mass % or less. If the oxygen content of the activated carbon exceeds 5 mass %, the lifetime of the catalyst falls, so this cannot be used for the present invention.

There is no particular lower limit value of the oxygen content. Even if almost no oxygen is contained, good catalyst characteristics are exhibited. The type of the oxygen-containing function group is not particularly limited.

By combining the above-mentioned control of the oxygen content and the control of the diameter of the micropores of the activated carbon surface, it is possible to suppress deterioration of the catalyst accompanying operation of the fuel cell. This is also a major advantage of use of the activated carbon of the present invention for a catalyst-carrying carbon material.

The mechanism for suppression of deterioration is not clear, but it is believed that the interaction between the edge carbon forming the inside walls of the pores of the activated carbon and the fine particles of the catalyst metal is stronger than the interaction between a usual carbon carrier and the catalyst fine particles, so the state of the electrons of the fine particles of the catalyst metal is improved and as a result the elution of the metal ingredients from the surface of the fine particles is suppressed and the lifetime of the catalyst is extended.

Even if using the activated carbon defined by the present invention for the carrier, reducing the above-mentioned fine particles of catalyst metal in size and increasing them in density, and improving the affinity with the polymer electrolyte, to get the anticipated characteristics of this catalyst expressed in the electrode of a solid polymer electrolyte type fuel cell, it is necessary that the characteristic to be provided by a gas electrode, that is, a gas diffusion ability, be secured, that is, a porous electrode be formed.

As a physical property of the powder for this purpose, the present invention defines the DBP oil absorption. The DSP oil absorption examines the relationship between the amount of dibutyl-phthalate (DBP) added dropwise while kneading a predetermined amount of dried carbon and the kneading torque. The amount of DBP dropped when carbon is wet by DBP, DBP contacts all of the powder, and the torque in the kneading starts to rise is defined as the DBP oil absorption.

That is, the DBP oil absorption corresponds to the average value of the amount of liquid which one powder particle can hold when the powder particles agglomerate. In the case of activated carbon, the pores running from the particle surface to the inside contribute to the adsorption of the liquid, a slightly larger DBP oil absorption is observed due to the pore volume as compared with the true volume between particles, but as a primary approximation, this serves as a rough measure of the spaces between particles.

The inventors engaged in in-depth studies on the use of the activated carbon of the present invention as a carrier and as a result discovered that activated carbon having a DBP oil absorption of 30 ml/100 g or more, preferably 50 ml/100 g or more, exhibits superior electrode characteristics. If the DBP oil absorption is 30 ml/100 g or less, the gas diffusion rate cannot keep up with the electrode reaction and as a result the resistance to gas diffusion causes the output voltage to drop, so this cannot be used for the present invention.

Further, if the DBP oil absorption exceeds 1000 ml/100 g, the bulk density of the electrode becomes too small, so the thickness of the electrode for obtaining the predetermined amount of the catalyst metal becomes too great and as a result the resistance to gas diffusion in the electrode increases and the output voltage ends up falling.

In the case of secondary aggregates, it is preferable that the primary particles satisfy the above-mentioned conditions of the particle shape.

(Particle Shape of Activated Carbon)

The shape of the activated carbon of the present invention is not particularly limited so long as the above-mentioned indicators are satisfied. Giving an example, it may also be a fine particle shape, fine diameter fiber shape, or secondary aggregate of fine particles bonded together.

In the case of particle shaped activated carbon, an optimum range is designated for the particle size. The inventors engaged in in-depth studies and as a result found that specifically a 10 nm to 1 μm average particle size is suitable for the present invention. More preferably, the size is 20 nm to 800 nm.

With particles of a diameter smaller than 10 nm, introduction of pores of a diameter of 2 nm or less is extremely difficult in practice. Further, with particles of a diameter of over 1 μm, the surface area per unit mass of the carrier is too small and the fine particles of catalyst metal cannot be carried at a high density.

When the activated carbon is a fibrous state, use in the state with the fiber crushed to a powder is preferred. The inventors found that the diameter of the fiber is preferably equal to the diameter in the case of particles and that 10 nm to 1 μm of average particle size is preferable for the present invention and that 20 nm to 500 nm is more preferable.

Further, when crushing the fiber, it is possible to use a powder having an aspect ratio (fiber length/fiber diameter) of 100 or less, more preferably 50 or less, for the present invention. When the aspect ratio is over 100, the bulk density of the electrode becomes too small and the catalyst layer for obtaining the necessary amount of platinum becomes too thick, so an uneven electrode reaction is caused and the performance ends up falling.

(Method of Production and Carbon Material of Activated Carbon)

So long as the activated carbon prescribed in the present invention satisfies the indicators prescribed in the present invention, the method of production and carbon material are not limited.

Giving an example of the method of production of the activated carbon, as the method of activation, the method of treatment in an inert atmosphere of an inert gas containing water vapor, carbon dioxide gas, etc. at 600° C. to 1200° C. in temperature for several hours so as to introduce pores into the carbon material or the method of mixing a hydroxide of an alkali metal and a carbon material powder using carbonate as an activating agent and treating it in an inert atmosphere at 500° C. to 1100° C. in temperature so as to introduce pores into the carbon material may be used.

The carbon material of the activated carbon of the present invention is not particularly limited. Giving specific examples of the carbon material, petroleum-based coke, coal-based coke, phenol resin, furan resin, etc. may be suitably used.

<Optimization of the Surface Structure and 3D Structure of the Catalyst Carrier Carbon Material>

The inventors engaged in in-depth studies and as a result discovered that it is possible to obtain a superior catalyst performance by controlling the surface strength of the catalyst-carrying carbon material and simultaneously controlling the 3D structure of the carbon material.

Specifically, the volume of micropores of a diameter of 2 nm or less is preferably 0.1 ml/g or more, more preferably 0.3 ml/g or more. This is because pores of an extremely fine 2 nm or less function as sites for adsorption of fine particles of precious metal. This is a condition necessary for high dispersion of fine particles of catalyst metal.

If the pore volume is less than 0.1 ml/g, the planar density of the adsorption sites of the fine particles of catalyst metal on the surface of the catalyst-carrying carbon material surface falls and the fine particles of catalyst metal cannot be carried at a high density. Further, the fine particles of catalyst metal easily aggregate, so the particle size of the catalyst metal ends up becoming larger.

The volume of pores of 2 nm or less size is not particularly limited, but actually is usually 2 ml/g or less. Obtaining over such a carbon material is difficult. As a second function of micropores of 2 nm or less size, the effect of enhancing the affinity with the electrolytic material can be mentioned.

If possible to improve the affinity between the carrier surface and polymer electrolyte, the ratio of the fine particles of catalyst metal carried on the carrier contacting the electrolyte polymer, that is, the effective surface area of the catalyst reaction, can be enlarged.

Due to this, with the same catalyst metal mass, the effective catalyst reaction area is enlarged, so the output voltage of the electrode rises. Alternatively, the mass of the catalyst metal required for obtaining the same output voltage can be reduced.

The inventors engaged in indepth studies and as a result discovered that as a specific numerical value for ensuring that the contact between the electrolytic material and the catalyst-carrying carbon material be sufficiently raised to an extent improving the output voltage, the lower limit of the volume of micropores of 2 nm or less size is 0.1 ml/g. If the volume of micropores is less than 0.1 ml/g, no substantive improvement can be recognized in the output voltage.

To ensure that the fine particles of catalyst metal are uniformly dispersed at a particle size of about 2 nm, the surface area of the carrier must originally also be large. The inventors engaged in indepth studies and as a result discovered that a specific surface area by the SET method of the catalyst-carrying carbon material contained in the catalyst layer of 500 m²/g or more is preferable, further 800 m²/g or more is preferable. The specific surface area is not particularly limited, but in practice 4000 m²/g or so is the upper limit. Obtaining a carbon material over this is difficult.

Due to the growth of the structure, a network is formed for gas diffusion and removal of produced water. Flooding does not easily occur even when taking out a high current. For this reason, the catalyst-carrying carbon material preferably has a DBP oil absorption of 300 ml/100 g or more, more preferably 400 ml/100 g or more.

However, if the DBP oil absorption exceeds 1000 ml/100 g, the bulk density of the electrode becomes too small, so the thickness of the electrode required for obtaining a predetermined amount of catalyst metal becomes too great and as a result the resistance to gas diffusion in the electrode increases and the output voltage ends up falling.

(Type of Catalyst Metal)

The catalyst ingredient used in the present invention is not particularly limited in type.

If giving examples, platinum, palladium, ruthenium, gold, rhodium, osmium, iridium, and other precious metals, complexes or alloys of precious metals combining two or more types of these precious metals, complexes of precious metals with organic compounds or inorganic compounds, transition metals, complexes of transition metals with organic compounds or inorganic compounds, metal oxides, etc. may be mentioned.

Further, it is possible to use a complex of two or more types of these.

(Carrying Rate)

The carrying rate of the catalyst ingredient on the carrier is not particularly limited, but preferably is 1 mass % to 90 mass %. If less than 1 mass %, the thickness of the catalyst layer required for obtaining the output voltage necessary for practical application becomes too great, so the overcurrent ends up becoming larger.

Further, with a carrying rate of over 90 mass %, fine dispersion of the catalyst ingredient becomes difficult in practice. Further, the density of the catalyst ingredient in the catalyst layer becomes too high, it becomes difficult for the gas-diffusing carbon material to remove the large amount of water produced at the time of large current density load operation, and stable fuel cell operation ends up being obstructed.

Here, the "carrying rate" is the mass of the catalyst ingredient divided by the total mass of the catalyst ingredient and the carrier ingredient expressed by %.

(Method of Carrying Fine Particles of Catalyst Metal)

The catalyst-carrying carbon material defined in the present invention achieves fine particles of catalyst metal and high density carrying due to its high density adsorption sites. The method of carrying the fine particles of catalyst metal is not particularly limited.

If giving a specific example of the method of carrying the catalyst metal, a reducing agent and hydrogen hexachloroplatinate are mixed in a suitable solvent to produce a colloid of fine particles of platinum. To stabilize the colloid, for example, polyvinyl alcohol or another polymer colloid protection agent may be added to the system.

The thus prepared colloid of fine particles of platinum may then be charged with the carrier carbon material and stirred to cause the platinum colloid to be adsorbed on the carrier.

In addition, the platinum precursor hydrogen hexachloroplatinate may be carried on the carbon material, then the material heat treated in a hydrogen atmosphere to cause fine particles of platinum to be carried on activated carbon.

<Metal Complex Catalyst>

In the present invention, in addition to the "control of the wet environment of the catalyst layer" and the "control of the structure of the carrying carbon material", the amount of the precious metal catalyst ingredient used is reduced, that is, a reduction of cost is contributed to, by the technique of inclusion of an N4-chelate-type metal complex as the catalyst ingredient.

In a fuel cell, in particular a solid polymer type fuel cell, the catalyst is required to exhibit its catalytic action under a strong acidic electrolyte environment, so the catalyst must have chemical stability under an acidic environment as an essential requirement.

The inventors engaged in indepth studies on the various types of metal complexes with high oxygen reduction reaction activity and as a result discovered that a metal complex with an N4-chelate structure is highest in chemical stability and may be preferably used in the present invention.

In the case of a cyclic compound complex other than an N4-chelate structure, even if the initial catalyst activity is high, along with continuous operation of the fuel cell, the metal ingredient at the center of the complex is eluted and as a result the activity ends up falling along with time.

More preferably, the metal complex has an N4-chelate structure and has at least two of the N atoms bonded with the center metal constituted as imine types.

By employing imine type bonds, the center metal ingredient is further improved in chemical stability making this suitable for the present invention.

In the metal complex of the present invention for replacing the platinum, the important points are inherently that, (a) a metal complex with a high catalyst activity on its own be used, (b) the metal complex and a precious metal be made to coexist to express the catalytic action, and (c) the above-mentioned catalyst function be sufficiently brought out by carrying the catalyst on a carrier comprised of a carbon material.

The oxygen reduction reaction by the metal complex begins when oxygen molecules are adsorbed at the metal atom positioned at the center of the metal complex. In particular, when the center metal is a transition metal, a stable adsorption state is obtained. This is preferable for the present invention.

The reason why a transition metal is preferred is that charge movement from the bonding orbit of the oxygen molecules to the empty s-orbit of the transition metal atom of the adsorption site (donation) and charge movement from the d-orbit of the transition metal atom to the antibonding orbit of the oxygen molecules (back donation) occur simultaneously (Kobayashi, T., Yamaguchi, K., *Surface*, Vol. 23, p. 311 (1985)).

The inventors engaged in indepth studies and as a result discovered that among the transition metals, in particular a transition metal element of Group V, Group VI, Group VII, or Group VIII of the Periodic Table is preferred.

The reason is not necessarily clear, but from the viewpoint of the stability of an N4-chelate complex of a transition metal, the metal atom has to have a bivalent form as a stable form. Further, in the process of an oxygen reduction reaction, the metal element must change to a high oxidized state, that is, that is, a trivalent or higher high valence state. From these two conditions, it is believed that transition metals of Group V, Group VI, Group VII, or Group VIII of the Periodic Table will exhibit superior characteristics.

For a metal complex to have a high oxygen reduction activity, ease of back donation among the above two types of charge movement is important. That is, if the electron density of the oxygen molecule increases, the affinity with protons increases and electrons flow into the antibonding orbit of the oxygen molecule, whereby the bond between the oxygen atoms is weakened, so a four-electron reduction reaction accompanying cleavage of the O—O bond may also easily occur.

Therefore, by calculating the O—O bond distance of the oxygen molecule, an indicator of the degree of back donation from the metal atom to the oxygen molecule, it is possible to estimate the activity of the oxygen reduction reaction. These calculations can be performed using the ab initio molecular orbit method, the density function method, or other methods of calculation, but from the viewpoint of the relative ease of calculation and the high calculation precision obtained, the density function method is effective. As this density function method, the B3LYP-method and other various methods are employed.

Therefore, the inventors studied whether the results of calculation by the B3LYP method are correlated with the actual catalyst activity. All calculations were performed using a Gaussian98 program. The basis function used was a 6-31G basis function for typical elements, for metal elements, (14s8p5d)/[5s3p2d] described in *gaussian basis sets for molecular calculations*, S. Hujinaga (ed.), Elsevier (1984).

First, the adsorption structures of oxygen molecules of cobalt (II) complex of dibenzotetraazaannulene (abbreviated as "CoDTAA"), the cobalt (II) complex of 5,10,15,20-tetrakis-(4-methoxyphenyl)polyporphyrin (abbreviated as "CoTMPP"), the cobalt (II) complex of 5,10,15,20-tetraphenylpolyporphyrin (abbreviated as "CoTPP"), and the cobalt (II) complex of phthalocyanine (abbreviated as "CoPc") were calculated by the B3LYP-method.

As a result, it was learned that their O—O bond distances were, respectively, 0.1305 nm, 0.1288 nm, 0.1287 nm, and 0.1254 nm.

Further, CoTMPP, CoTPP, and CoPc were carried on carbon black (made by Lion Corporation, KETJEN BLACK EC600JD) and were measured for current-voltage characteristic using a rotary disk electrode while not yet heat treated. When comparing the potentials at the time of current values of half of the saturated current values (saturated calomel electrode (SCE) standard), they were respectively 0.119V, 0.083V, and 0.075V.

Further, according to the Document (H. Jahnke et al., *Top. Corr. Chem.*, Vol. 1, p. 133 (1976)), CoDTAA is reported to have a higher activity than CoTMPP. Therefore, by the above study, it was learned that the O—O bond distance found by calculations is correlated with the oxygen reduction catalyst activity.

Therefore, the inventors further engaged in further studies of the structure of metal complexes superior in oxygen reduction catalyst activity by calculating the O—O bond distances of adsorbed oxygen molecules. As a result, the O—O bond distances in the oxygen adsorption structures of the metal complexes shown by the following two chemical formulas were calculated to be respectively 0.1320 nm and 0.1316 nm or further longer than the case of CoDTAA. It was learned that large ring compound complex of the following two chemical formulas have catalyst activity of the CoDTAA level or more.

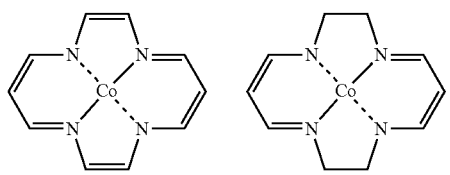

On the other hand, the center metal atom of a metal complex shifts to a high oxidized state at the time of oxygen reduction. In order to restore the catalyst ability at the next reaction cycle, the center metal atom must be reduced to the low oxidized state. This reduction reaction proceeds more easily the stronger the electron attraction of the complex ligand.

As opposed to this, the above-mentioned O—O bond distance of an adsorbed oxygen molecule tends to become longer the stronger the back donation of the metal atom to the oxygen molecule, that is, the stronger the electron donor property of the ligand.

Considering the above points, when the O—O bond distance of an adsorbed oxygen molecule is too long, the reduction reaction of the center metal is liable to become difficult, so the above-mentioned O—O bond distance is preferably 0.136 nm or less.

As the ligand of the metal complex preferably used in the present invention, the ligands shown in the (general formula 1) and the (general formula 2) may be mentioned. Here, the substituent groups shown by R1 to R24 are hydrogen or substituent groups. The substituent groups may be the same or different. Substituted and nonsubstituted alkyl groups, aryl groups, etc. may be mentioned.

As alkyl groups, a methyl group, ethyl group, n-propyl group, i-propyl group, methoxy group, ethoxy group, etc. may be mentioned. Two alkyl groups may also form a ring. For example, a compound where the R1 and R2 alkyl substituent groups form a closed ring to form a cyclohexyl ring may be mentioned.

As specific ligands, 5,7,12,14-tetramethyl-1,4,8,11-tetraazacyclotetradeca-2,4,6,9,11,13-hexaene, 5,7,12,14-tetramethyl-1,4,8,11-tetraazacyclotetradeca-4,6,11,13-tetraene, etc. may be mentioned.

As aryl groups, a phenyl group, alkyl-substituted phenyl group, etc. may be mentioned. As specific ligands, 6,13-diphenyl-1,4,8,11-tetraazacyclotetradeca-2,4,6,9,11,13-hexaene etc. may be mentioned.

Among these ligands, alkyl group substituted compounds are preferred since they can be easily synthesized.

Further, the catalyst activity changes depending on the type of the transition metal element as well. The inventors engaged in indepth studies and as a result discovered that a high activity is shown regardless of the type of the ligand by one or both of Co and Fe and that these may be preferably used for the present invention.

The amount of the metal complex carried in the present invention is preferably, in terms of the amount of metal element carried, 2 mass % or less, more preferably 1 mass % or less. If carried in over 2 mass %, the catalytic action of the metal complex becomes relatively stronger and the amount of increase of the catalyst activity due to the copresence with the precious metal ends up becoming smaller.

Further, to bring out the function as a catalyst, the amount of the metal complex carried is preferably, in terms of the amount of metal element carried, 0.01 mass % or more, more preferably 0.05 mass % or more.

The complex catalyst comprised of the copresent metal complex and precious metal in the present invention, as shown specifically in the later examples, is based on the experimental fact that compared with the catalyst activity of these alone, the catalyst activity of the copresent form is higher.

The theoretical explanation for this is not yet clear, but for example it is believed that along with the four-electron reduction reaction on the precious metal, there is a two-electron reaction on the metal complex, then a two-electron reaction on the precious metal or other oxygen reduction reaction by two reduction reaction paths, so the catalyst activity is promoted more by the copresent form than the respective individual forms.

The "precious metal" used in the present invention indicates ruthenium, rhodium, palladium, osmium, iridium, platinum, and alloys containing these as main ingredients.

From the high level of catalyst activity, in the present invention, ruthenium, rhodium, palladium, osmium, iridium, platinum, and alloys having these as main ingredients are preferably used.

Use of an alloy having platinum as its main ingredient is further preferred. Other precious metals have a lower catalyst activity compared with platinum. An improvement in catalyst activity due to copresence of a metal complex is recognized, but the amount of that improvement is small.

The amount of the precious metal copresent with the metal complex catalyst in the present invention is preferably 50 mass % or less. If over 50 mass % is carried, the catalytic action of the precious metal alone becomes relatively stronger and the increase in the catalyst activity due to the copresence with the metal complex ends up becoming smaller.

Further, if considering also the viewpoint of the cost of the catalyst, the amount of the precious metal carried is more preferably 40 mass % or less. Further, to realize the function as a catalyst, the amount of the precious metal carried is preferably 1 mass % or more, more preferably 2 mass % or more.

Further, to sufficiently realize the function of the metal complex catalyst in the present invention, it is inherently important that the metal complex catalyst be carried on a carbon material. The nature of the catalyst activity of the catalyst defined in the present invention is deduced to be the interaction between the surface of the carbon material and the metal complex through the it electrons.

Therefore, the inventors engaged in indepth studies on a method of preparation of the catalyst aiming at further strengthening this n electron interaction and as a result discovered that by making the surface of the carbon powder carrying a metal complex and precious metal, then heat treating the result in a nonoxidizing atmosphere at 500° C. to 1100° C. in temperature, it is possible to prepare a high activity catalyst.

Here, if treating this in an oxidizing atmosphere, oxidation erosion of the carbon carrier and metal complex occurs and the catalyst activity is extinguished. Further, with heat treatment at less than 500° C. in temperature, the n electron interaction between the carbon carrier and metal complex is not sufficient and the catalyst activity is not realized. On the other hand, heat treatment at over 1100° C. temperature results in heat decomposition of the metal complex and therefore loss of catalyst activity.

This method of preparation of a catalyst is similarly effective even when only a metal complex is carried on a carbon carrier and when a metal complex and a precious metal catalyst are made copresent in a complex catalyst system.

To improve the catalyst activity by a metal complex, or a copresent system of a metal complex and precious metal, the carrier of the catalyst, that is, the carbon material, preferably has a large surface area. The effect of the catalyst carrier is not just the physical effect of increasing the area of the reaction, but also activation of the catalytic action through chemical interaction with the metal complex.

As explained above, in the process of a catalyst reaction of a metal complex, the restoration of the catalyst function by reduction of the center metal atom is achieved by the movement of electrons from the ligand chelate bonded to the metal atom. The movement of electrons from the ligand to the metal atom is further facilitated by the carrier of the carbon material forming a giant π-electron system.

The inventors engaged in indepth studies on the surface area of the carrying carbon material and as a result discovered that the specific surface area found by BET-type evaluation of the adsorption isotherm of nitrogen gas (BET specific surface area: SBET) is a suitable indicator.

The specific range of the numerical value is 500 $m^2/g$ or more. If less than 500 $m^2/g$, the relief shapes on the carbon surface, defects in the carbon net surface due to the fine pores, and amount of edge parts believed to amplify the catalyst activity of the metal complex become insufficient and the catalyst activity will not be improved.

On the other hand, if increasing the surface area to 3000 $m^2/g$ or more, fine pores deeply penetrating into the carbon are formed and the ratio of the inside surfaces of the fine pores to the reaction sites as a whole becomes larger, so the diffusion of oxygen or other movement of substances becomes the limiting factor, these pores cannot form actual catalyst reaction sites, and the catalyst activity conversely ends up deteriorating, so this is not preferable for the present invention.

The carbon carrier used as the carrier of the metal complex or the copresent catalyst of the metal catalyst and precious metal catalyst in the present invention is preferably a fine particle powder in form in order to carry the catalyst transition metal complex at a high density. The optimum particle size is an average diameter of 10 nm to 1 μm.

When the particles forming the smallest units originally have a secondary structure such as an aggregate structure such as with carbon black, said average diameter is made the diameter of the primary particles.

If the average diameter is less than 10 nm, introduction of micropores of substantively 2 nm or less size into the carrier surface becomes difficult, while if the average diameter is over 1 μm, the thickness of the electrode layer necessary for securing an effective surface area for the catalyst reaction increases, so the resistance to gas diffusion resistance becomes larger and the performance of the fuel cell ends up falling.

<Structure of Gas Diffusion Layer>

In the present invention, the important technology is the formation of a gas diffusion electrode comprised of a combination of gas diffusion layers suitable for a high performance catalyst layer. By this, the inventors succeeded in drawing-out the inherent performance of the catalyst layer to the maximum extent.

That is, the gas diffusion layer of the present invention is comprised of a two-layer structure of a separator side layer of a gas diffusion fiber layer having fibrous carbon material as its main ingredient and a catalyst layer side layer of a micropore layer having carbon black as its main ingredient.

The reason why a gas diffusion fiber layer having a fibrous carbon material as its main ingredient is selected as the separator side is that both a gas permeability and electron conductivity are aimed at. A fibrous carbon material is a suitable material as a material forming large pores through which gas can easily diffuse and able to offer good electron conductivity.

While not particularly limited to this, if showing preferred examples, carbon cloth and carbon paper comprised of may be mentioned.

In the present invention, the fibrous carbon material is the main ingredient of the gas diffusion fiber layer. To increase the mechanical strength, this may be reinforced by a polymer material or other binder. Further, this may be used carburized and otherwise combined with a second or third ingredient.

Further, the fibrous carbon material may be coated by a fluororesin or surfactant, silane coupling agent, etc. to make the surface of the fibrous carbon material more hydrophobic. Alternatively, the fibrous carbon material may be heat treated in an inert atmosphere to increase its hydrophobicity.

As the coating means, the method of bringing the gas diffusion fiber layer into contact with a fluororesin emulsion, a solution in which crushed fluororesin is dispersed, a solution containing a silane coupling agent, etc. by coating, dipping, spraying, etc. and then drying the same etc.

In the case of a fluororesin, the coating may be made uniform after drying by raising it in temperature to the melting point or more and making it melt or soften.

The gas diffusion fiber layer of the present invention has a large pore size, so has a rough structure. Therefore, with a structure calling for direct contact with a catalyst layer having a microstructure, when assembling the cell, there are less contact sites between the gas diffusion fiber layer and catalyst layer or the planar pressure applied to the catalyst layer ends up becoming rough in distribution.

These for example lead to an undesirable spread in the electron conduction resistance or gas diffusion ability in the catalyst layer and further the reactivity etc. As a result, a sufficient cell performance can no longer be exhibited.

To prevent such a problem, a micropore layer is provided between the gas diffusion fiber layer and the catalyst layer. If it were possible to use a material having a finer microstructure, preferably a scale of structure the same as the catalyst layer, and not impairing the gas diffusion ability and electron conductivity so as to cancel out the roughness of the structure of the gas diffusion fiber layer and connect this with the catalyst layer, it would be possible to suppress an undesirable spread in the reaction in the catalyst layer and would be possible to realize sufficient cell performance.

The micropore layer of the present invention uses carbon black as its main ingredient. The first reason why carbon black is used is that it has the same scale of structure as the catalyst layer, has superior electron conductivity, and, depending on the type, has suitable surface characteristics, so it is possible to effectively prevent blockage of the gas diffusion paths by water.

This carbon black can be selected using the amount of adsorption of water vapor as an indicator. Specifically, if the carbon black has an amount of adsorption of water vapor at 25° C. and a relative humidity of 90% of 100 ml/g or less, for example, it is possible to suppress blockage of the gas diffusion paths at the cathode side by the water produced at the time of large current discharge and possible to take out current by a stable voltage.

If over 100 ml/g, condensed water builds up in the micropore layer at the time of current discharge, the gas diffusion paths are blocked, and the voltage behavior becomes unstable.

To obtain a further higher effect, carbon black having an amount of adsorption of water vapor at 25° C. and a relative humidity of 90% of 1 ml/g to 50 ml/g is selected.

If in this range, even at the time of a small current discharge where there is little water produced inside the cathode, it is possible to prevent the electrolytic material in the cathode from drying out and maintain a suitable wet state, while even at the time of a large current discharge, the water produced inside the catalyst layer can be efficiently discharged outside of the electrode and the gas diffusion paths can be secured. Therefore, a cell efficient over the entire range from low load to high load without regard as to the load conditions can be obtained.

Further, if carbon materials having an amount of adsorption of water vapor at 25° C. and a relative humidity of 90% of 1 ml/g to 50 ml/g, two or more types of carbon materials may be mixed for use as the gas-diffusing carbon material.

If the amount of adsorption of water vapor at 25° C. and a relative humidity of 90% is less than 1 ml/g, the effect of wetting the cell from the outside becomes difficult to obtain. In particular, at the time of startup etc., it becomes difficult to maintain the electrolytic material in a suitable wet state and the proton conductivity is liable to decline.

If the amount of adsorption of water vapor at 25° C. and a relative humidity of 90% exceeds 50 ml/g, when continuously taking out a large current etc., the water produced inside the catalyst layer cannot be discharged fast enough and the gas diffusion paths are liable to end up being blocked.

The carbon black used for the micropore layer of the present invention may be selected from generally available carbon black using as an indicator the amount of adsorption of water vapor.

Alternatively, even carbon black having an amount of adsorption of water vapor outside the preferred range may be treated to adjust it to the preferred range.

For example, if the amount of adsorption of water vapor is too great, in general the amount of fluororesin et. al blended is sometimes increased to impart hydrophobicity, but control for satisfying the electron conductivity and further the gas diffusion ability etc. is difficult, so this is not preferred. The method of firing the carbon black in an inert atmosphere to lower the amount of adsorption of water vapor to the preferred range is preferred. For example, it is possible to heat treat the carbon material in an argon, nitrogen, helium, vacuum, or other atmosphere to reduce the amount of adsorption of water vapor.

Further, if the amount of adsorption of water vapor is too small, it is possible to treat the surface of the carbon material by an acid, base, etc. or expose it to an oxidizing atmosphere environment so as to increase the amount of adsorption of water vapor to the preferred range.

While not limited to this, for example, it is possible to treat the carbon material in warmed concentrated nitric acid, dip it in a hydrogen peroxide aqueous solution, heat treat it in an ammonia stream, dip it in a warmed sodium hydroxide aqueous solution, or heat treat it in dilute oxygen, dilute NO, or $NO_2$ so as to increase the amount of adsorption of water vapor.

The second reason why carbon black is used for the micropore layer of the present invention is the three-dimensional structure of carbon black.

Carbon black forms secondary structures comprised of pluralities of primary particles fused together. Depending on the type, these structures grow and form a network of primary particles and spaces in between them.

With a micropore layer, these spaces can be connected to form gas diffusion paths surrounded by the network of the primary particles.

The thus formed gas diffusion paths are difficult to destroy even when tightly fastening the cell. The pore size at the time of formation of the micropore layer can be easily maintained over a long period. Further, if just determining the type of the carbon black using the structure as an indicator, the pore size of the gas diffusion paths formed by the micropore layer will be determined, so there is the advantage of easily control.

The micropore layer of the present invention preferably uses as its main ingredient a higher structure carbon black. This is because if a low structure, formation of gas diffusion paths by the structure can no longer be expected. The extent of the structure can be judged by the relationship between the DBP oil absorption and the specific surface area though there is also the method of determining it by observation under an electron microscope.

The "DBP oil absorption" is the amount of dibutyl phthalate absorbed by the carbon black when bringing dibutyl phthalate into contact with a unit mass of carbon black. It is mainly absorbed in the spaces between the primary particles, so if the structure grows, the DBP oil absorption becomes larger, while if the structure does not grow that much, the DBP oil absorption tends to become small.

However, DBP is also absorbed in the fine pores formed inside the primary particles in addition to the spaces between the primary particles, so the DSP oil absorption does not always express the extent of the structure as it is.

If the specific surface area such as measured by the nitrogen adsorption becomes larger, the DBP absorbed in the fine pores becomes greater and the overall DBP oil absorption also becomes greater.

Therefore, with a high structure carbon black, the DEP oil absorption becomes greater in proportion to the nitrogen adsorption, while with a low structure carbon black, the DSP oil absorption conversely becomes smaller in proportion to the nitrogen adsorption.

Preferably, if using carbon black with a ratio X/Y of the DBP oil absorption X ml/110 g and the nitrogen adsorption specific area Y $m^2/g$ of 1 or more, a preferable micropore layer providing gas diffusion paths can be formed.

This is because if the ratio of X/Y is 1 or more, the structure becomes larger and formation of gas diffusion paths by the structure can be expected.

If the ratio of X/Y is less than 1, formation of gas diffusion paths by the structure cannot be expected, and the spaces between the secondary particles of the carbon black mainly form the gas diffusion paths, so a sufficient pore size sometimes cannot be secured or the pores will easily collapse when fastening the cell. Therefore, control is difficult and stable performance of the catalyst layer is difficult to achieve.

More preferably, the ratio of X/Y is 1.5 or more. If 1.5 or more, the network of gas diffusion paths due to the structure sufficiently develops and flooding becomes difficult even when taking out a high current.

According to such a structure, the gas easily diffuses and blocking of the gas diffusion paths by the water becomes difficult, so the inherent performance of the catalyst layer can be easily drawn out.

The carbon black able to be used for the micropores of the present invention can be selected from, for example, commercially available carbon black by examining the amount of adsorption of water vapor and the ratio of the DBP oil absorption and nitrogen adsorption specific area.

Alternatively, the ratio of the DBP oil absorption and the nitrogen adsorption specific area satisfies a preferred range. If the amount of adsorption of water vapor is outside from the preferred range, the above-mentioned method may be used to change and optimize the amount of adsorption of water vapor.

The type of the carbon black is not particularly limited so long as it is a generally available one having electron conductivity. It is preferably not a material which undergoes chemical reactions other than the inherently sought reaction or elutes substances forming the carbon material due to contact with condensed water. A chemically stable carbon material is preferred.

The micropore layer may use the following carbon black as its main ingredient, but may also use another material in a complex form as a sub ingredient for improving the function.

For example, to increase the mechanical strength of the micropore layer without detracting from the surface characteristics or structure of the carbon black, it is also possible to immobilize the carbon black by a small amount of a fluororesin or other polymer material. The amount of this polymer material blended is preferably 40 mass % or less with respect to the total mass of the micropore layer.

If over 40 mass %, the pores for forming the gas diffusion paths are buried by the polymer material, a large number of pores formed by aggregation of the polymer material and carbon black is formed, and it is otherwise become difficult to have the pore size determined by just the structure of the carbon black.

More preferably, the amount is 20 mass % or less. If 20% or less, the effect of the polymer material is small, and the pores formed by the structure can be used for the micropore layer. Therefore, control becomes easy and gas diffusion paths resistant to change over a long period of time can be formed in the micropore layer.

The functions of the gas diffusion electrode of the present invention are not limited by the method of preparation.

The general method of preparation may be illustrated as follows. For example, it is possible to dip carbon paper or carbon cloth, as required, in a Teflon dispersion (note that Teflon is a trademark) and dry and fire it to make it hydrophobic, then mix carbon black and, if necessary, a Teflon emulsion to prepare a dispersion and spray coat and dry and heat it to form a micropore layer and thereby obtain the gas diffusion layer of the present invention.

After this, ink for forming the catalyst layer is spray coated and dried on the micropore layer side to obtain the gas diffusion electrode of the present invention.

When used for a cell, two gas diffusion electrodes prepared by the present invention are used to sandwich an electrolyte film, the assembly is bonded by a hot press, and the assembly is built into a separator so as to obtain a cell.

During the above process, for example, to increase the mechanical strength of the gas diffusion layer, it is also possible to hot press the assembly at the stage when the gas diffusion layers are formed and then coat the catalyst layers.

Further, as the method of coating in the coating of the micropore layer or catalyst layer, any of powder coating, electrophoresis, etc. may be used if able to form a micropore layer on the gas diffusion fiber layer or a catalyst layer on the micropore layer.

Alternatively, the method may be adopted of forming the micropore layer and the catalyst layer independently into films, stack them, and bond them by hot pressing.

EXAMPLES

<Measurement of Amount of Adsorption of Steam of Carbon Material>

As the carbon material contained in the catalyst layer, a total of six types of carbon black A, B, C, D, E, and F with different amounts of adsorption of water vapor were prepared. B, D, and E are commercially available types of carbon black, while A and C are B and D heat treated in argon. Further, F is E treated in warmed concentrated nitric acid, then rinsed and dried.

These types of carbon black were measured for amounts of adsorption of water vapor using a fixed capacity type water vapor adsorption device (made by Bel Japan, BELSORP18). Samples pretreated at 120° C. and 1 Pa or less for 2 hours to deaerate them were held in a 25° C. constant temperature tank, water vapor was gradually supplied from the vacuum state to the saturated water vapor pressure at 25° C. to change the relative humidity in stages, and the amounts of water vapor adsorbed by the samples were measured.

An adsorption isotherm was drawn from the obtained measurement results. The amount of adsorption of water vapor at the time of a relative humidity of 90% was read from the FIGURE. The results are shown in Table 1. Note that the "amount of adsorption of water vapor" is the amount of water vapor adsorbed per 1 g of sample converted to the volume of water vapor in the standard state.

(111) peak of platinum obtained by an X-ray diffraction device (made by Rigaku Corporation, Model RAD-3C).

Example 1

A catalyst-carrying carbon material of each of the carbon blacks A, B, C, D, E, and F was dispersed in a hydrogen hexachloroplatinate aqueous solution. While holding this at 50° C. and stirring, hydrogen peroxide was added, then an $Na_2S_2O_4$ aqueous solution was added to obtain a catalyst precursor.

Each of these catalyst precursors was filtered, rinsed, and dried, then reduced in a 100% $H_2$ stream at 300° C. for 3 hours to prepare each of the Pt catalysts 1 to 6 comprised of the catalyst-carrying carbon materials carrying 30 mass % of Pt. The Pt particle sizes of the Pt catalysts 1 to 6 are shown together in Table 1. The Pt particle sizes of the catalysts were 3 to 4 nm.

Each of the prepared Pt catalysts 1 to 6 was placed in a container, a 5% Nafion solution (made by Aldrich) was added to give a mass ratio of the Pt catalyst and Nafion of 1/1.4, this was lightly stirred, then the catalyst was crushed by ultrasonic waves, and butyl acetate was added while stirring to give a solid concentration of the Pt catalyst and Nafion combined of 6 mass % so as to prepare each of the catalyst inks 1 to 6.

Next, a gas-diffusing carbon material comprised of carbon black B was placed in a separate container, butyl acetate was added to give a concentration of carbon black of 6 mass %, and the carbon black was crushed by ultrasonic waves to prepare a gas-diffusing carbon material ink 1.

TABLE 1

| Type of carbon material | Amount of adsorption of water vapor ml/g | $S_{BET}$ $m^2/g$ | $S_{micro}/S_{total}$ | Micropore dia. nm | Micropore vol. ml/g | Oxygen content mass % | DBP oil absorption ml/100 g | Pt particle size nm | Pt Catalyst no. |
|---|---|---|---|---|---|---|---|---|---|
| A | 0.28 | 32 | 0.65 | 0.51 | 0.01 or less | 0.12 | 58 | 3.9 | 1 |
| B | 3.82 | 45 | 0.16 | 0.58 | 0.01 or less | 0.19 | 85 | 4.2 | 2 |
| C | 35.6 | 62 | 0.39 | 0.62 | 0.01 or less | 0.56 | 96 | 4.0 | 3 |
| D | 59.8 | 215 | 0.35 | 0.82 | 0.030 | 0.85 | 195 | 3.6 | 4 |
| E | 82.1 | 168 | 0.42 | 0.61 | 0.022 | 1.23 | 119 | 3.4 | 5 |
| F | 127 | 285 | 0.33 | 0.64 | 0.030 | 1.35 | 92 | 3.5 | 6 |

Further, Table 1 also shows the values of the physical properties used in the present invention. The methods of measurement will be shown below.

From measurement of the adsorption isotherm of the nitrogen gas, the specific surface area SBET by the BET method, the area Smicro and the total surface area Stotal of the micropores (pores of diameter of 2 nm or less) found by t-plot analysis, micropore volume Vmicro, and element analysis value of oxygen content.

The gas adsorption was measured using a Bel Japan BELSORP36, the t-plot analysis was performed using an analysis program attached with the device to calculate the above-mentioned physical properties.

The DBP oil absorption was measured by using an Absorptometer (made by Brabender) and converting the amount of DBP added at the time of 70% of the maximum torque to the DBP oil absorption per 100 g of the sample.

The particle size (diameter) of the Pt fine particles was estimated by the Scherrer method from the half value of the Next, 10 g of each of the prepared catalyst inks 1 to 6 was placed in a container and 2.5 g of the gas-diffusing carbon material ink 1 was added while stirring to prepare each of the catalyst layer inks 1 to 6.

Each of these catalyst layer inks 1 to 6 was coated and dried on a thin Teflon sheet to form a catalyst layer on the Teflon sheet. This was cut into a 2.5 cm×2.5 cm square to prepare each of the cathode-use catalyst layer-Teflon sheet laminates 1 to 6.

Further, the catalyst ink 4 was coated and dried repeatedly on a thin Teflon sheet to form a catalyst layer on the Teflon sheet. This was cut into 2.5 cm×2.5 cm squares to prepare anode-use catalyst layer-Teflon sheet laminates A.

Each of these prepared cathode-use catalyst layer-Teflon sheet laminates 1 to 6 and an anode-use catalyst layer-Teflon sheet laminate A were used to sandwich an electrolyte film (Nafion 112). These assemblies were hot pressed under conditions of 140° C. and 100 kg/$cm^2$ for 3 minutes, then the Teflon sheets were peeled off to thereby form the catalyst layer-electrolyte film laminates 1 to 6.

At this time, the difference between the mass of each catalyst layer-Teflon sheet laminate and the mass of the peeled off Teflon sheets was used to determine the mass of the catalyst layer transferred to the electrolyte film. The Pt content was found from this and the composition of the ink.

At this time, the amounts of the catalyst layer inks coated on the Teflon sheets were adjusted so that the Pt content of the cathodes became 0.07 mg/cm$^2$ and the Pt content of the anodes became 0.04 mg/cm$^2$.

Further, carbon paper treated in advance by PTFE to make it hydrophobic was cut into 2.5 cm×2.5 cm squares, two pieces were used to sandwich each catalyst layer-electrolyte film laminate, and these were further hot pressed under conditions of 140° C. and 100 kg/cm$^2$ for 3 minutes to obtain carbon paper-catalyst layer-electrolyte film laminates 1 to 6 (MEA1 to MEA6).

Below, the carbon paper-catalyst layer-electrolyte film laminates will be abbreviated as "MEA".

The obtained MEA1 to MEA6 were attached to fuel cell measurement devices and measured for cell performances. The cell performances were measured by changing the voltage between cell terminals in stages from the open voltage (usually 0.9V to 1.0V) to 0.2V and measuring the current density when a voltage of 0.6V was flowing between the cell terminals.

As the gas, the cathode was supplied with air and the anode with pure hydrogen to give rates of utilization of 50% and 80%. These gases were adjusted in pressure to 0.1 MPa by a back pressure valve provided downstream from the cell. The cell temperature was set at 80° C., and the supplied air and pure hydrogen were bubbled through distilled water warmed to 80° C. and 90° C. to wet them.

The catalyst precursor was filtered, rinsed, and dried, then reduced in a 100% $H_2$ stream at 300° C. for 3 hours to prepare the Pt catalyst 7 comprised of the catalyst-carrying carbon material carrying 20 mass % of Pt. The Pt particle size of the Pt catalyst 7 was 3 to 4 mm.

The prepared Pt catalyst 7 was placed in a container, a 5% Nafion solution (made by Aldrich) was added to give a mass ratio of the Pt catalyst and Nafion of 1/1.6, this was lightly stirred, then the catalyst was crushed by ultrasonic waves, and butyl acetate was added while stirring to give a solid concentration of the Pt catalyst and Nafion combined of 6 mass % so as to prepare the catalyst ink 7.

Next, a gas-diffusing carbon material comprised of carbon black C was placed in a separate container, butyl acetate was added to give a concentration of carbon black of 6 mass %, and the carbon black was crushed by ultrasonic waves to prepare a gas-diffusing carbon material ink 2.

Next, 10 g amounts of the prepared catalyst ink 7 were placed in seven containers and 0 g, 0.204 g, 0.870 g, 1.111 g, 2.500 g, 4.286 g, and 12.222 g of the gas-diffusing carbon material ink 2 were added while stirring to prepare the catalyst layer inks 7 to 13.

Each of these catalyst layer inks 7 to 13 was repeatedly coated and dried on a thin Teflon sheet to form a catalyst layer on the Teflon sheet. This was cut into a 2.5 cm×2.5 cm square to prepare each of the cathode-use catalyst layer-Teflon sheet laminates 7 to 13.

Each of these prepared cathode-use catalyst layer-Teflon sheet laminates 7 to 13 and an anode-use catalyst layer-Teflon sheet laminate A prepared in Example 1 were used to

TABLE 2

| | | Anode | | | Cathode | | | |
| --- | --- | --- | --- | --- | --- | --- | --- | --- |
| | | Type of catalyst-carrying | Pt carrying rate of | Content of gas-diffusing carbon | Type of catalyst-carrying | Pt carrying rate of | Gas-diffusing carbon material | Current density |
| | MEA no. | carbon material | catalyst mass % | material mass % | carbon material | catalyst mass % | Type | Content mass % | at 0.6 V (mA/cm$^2$) |
| Comp. ex. | MEA1 | D | 30 | 0 | A | 30 | B | 20 | 508 |
| | MEA2 | D | 30 | 0 | B | 30 | B | 20 | 583 |
| | MEA3 | D | 30 | 0 | C | 30 | B | 20 | 612 |
| Inv. ex. | MEA4 | D | 30 | 0 | D | 30 | B | 20 | 885 |
| | MEA5 | D | 30 | 0 | E | 30 | B | 20 | 1060 |
| | MEA6 | D | 30 | 0 | F | 30 | B | 20 | 1032 |

Table 2 shows the results of measurement of the cell performance of MEA1 to MEA6 together with the compositions of the catalyst layers. As shown in Table 1, MEA4 to MEA6 of the examples of the present invention, where the catalyst-carrying carbon materials had amounts of adsorption of water vapor at 25° C. and a relative humidity of 90% of 50 ml/g or more, exhibited superior cell performances compared with the MEA1 to MEA3 of the comparative examples.

Example 2

A catalyst-carrying carbon material comprised of the carbon black D was dispersed in a hydrogen hexachloroplatinate aqueous solution. While holding this at 50° C. and stirring, hydrogen peroxide was added, then an $Na_2S_2O_4$ aqueous solution was added to obtain a catalyst precursor.

sandwich an electrolyte film (Nafion 112). These assemblies were hot pressed under conditions of 140° C. and 100 kg/cm$^2$ for 3 minutes, then the Teflon sheets were peeled off to thereby form the catalyst layer-electrolyte film laminates 7 to 13. At this time, the difference between the mass of each catalyst layer-Teflon sheet laminate and the mass of the peeled off Teflon sheets was used to determine the mass of the catalyst layer transferred to the electrolyte film. The Pt content was found from this and the composition of the ink.

At this time, the amounts of the catalyst layer inks coated on the Teflon sheets were adjusted so that the Pt content of the cathodes became 0.07 mg/cm$^2$ and the Pt content of the anodes became 0.04 mg/cm$^2$.

Further, carbon paper treated in advance by PTFE to make it hydrophobic was cut into 2.5 cm×2.5 cm squares, two pieces were used to sandwich each catalyst layer-electrolyte film laminate, and these were further hot pressed under conditions of 140° C. and 100 kg/cm² for 3 minutes to the MEA7 to MEA13.

The obtained MEA7 to MEA13 were measured for cell performance under conditions similar to Example 1.

TABLE 3

|  | MEA no. | Anode | | | Cathode | | | | Current density at 0.6 V (mA/cm²) |
|---|---|---|---|---|---|---|---|---|---|
|  |  | Type of catalyst-carrying carbon material | Pt carrying rate of catalyst mass % | Content of gas-diffusing carbon material mass % | Type of catalyst-carrying carbon material | Pt carrying rate of catalyst mass % | Gas-diffusing carbon material Type | Gas-diffusing carbon material Content mass % |  |
| Comp. Ex. | MEA7 | D | 30 | 0 | D | 20 | C | 0 | 306 |
| Inv. Ex. | MEA8 | D | 30 | 0 | D | 20 | C | 2 | 354 |
|  | MEA9 | D | 30 | 0 | D | 20 | C | 8 | 528 |
|  | MEA10 | D | 30 | 0 | D | 20 | C | 10 | 624 |
|  | MEA11 | D | 30 | 0 | D | 20 | C | 20 | 721 |
|  | MEA12 | D | 30 | 0 | D | 20 | C | 30 | 571 |
|  | MEA13 | D | 30 | 0 | D | 20 | C | 55 | 321 |

Table 3 shows the results of measurement of the cell performance of MEA7 to MEA13 together with the compositions of the catalyst layers. As shown in Table 3, MEA8 to MEA13 of the examples of the present invention, where gas-diffusing carbon materials were included in the cathodes, exhibited superior cell performances compared with the MEA7 of the comparative example where a gas-diffusing carbon material was not included.

Further, among the MEA7 to MEA13 of the examples, MEA9 to MEA12, where gas-diffusing carbon materials were included in amounts of 5 mass % to 50 mass %, exhibited particularly superior performances.

Example 3

A catalyst-carrying carbon material comprised of the carbon black F was dispersed in a hydrogen hexachloroplatinate aqueous solution. While holding this at 50° C. and stirring, hydrogen peroxide was added, then an $Na_2S_2O_4$ aqueous solution was added to obtain a catalyst precursor. The catalyst precursor was filtered, rinsed, and dried, then reduced in a 100% $H_2$ stream at 300° C. for 3 hours to prepare the Pt catalyst 8 comprised of the catalyst-carrying carbon material carrying 50 mass % of Pt. The Pt particle size of the Pt catalyst 8 was 3 to 4 nm.

The prepared Pt catalyst 8 was placed in a container, a 5% Nafion solution (made by Aldrich) was added to give a mass ratio of the Pt catalyst and Nafion of 1/2, this was lightly stirred, then the catalyst was crushed by ultrasonic waves, and butyl acetate was added while stirring to give a solid concentration of the Pt catalyst and Nafion combined of 6 mass % so as to prepare the catalyst ink 8.

Next, a gas-diffusing carbon material comprised of each of the carbon black A, B, C, D, E, and F was placed in a separate container, butyl acetate was added to give a concentration of carbon black of 6 mass %, and the carbon black was crushed by ultrasonic waves to prepare each of the gas-diffusing carbon material inks 3 to 8.

Next, 10 g amounts of the prepared catalyst ink 8 were placed in six containers and 3.333 g of the gas-diffusing carbon material inks 3 to 8 were added while stirring to prepare the catalyst layer inks 14 to 19.

Each of these catalyst layer inks 14 to 19 was coated and dried on a thin Teflon sheet to form a catalyst layer on the Teflon sheet. This was cut into a 2.5 cm×2.5 cm square to prepare each of the cathode-use catalyst layer-Teflon sheet laminates 14 to 19.

Each of these prepared cathode-use catalyst layer-Teflon sheet laminates 14 to 19 and an anode-use catalyst layer-Teflon sheet laminate A prepared in Example 1 were used to sandwich an electrolyte film (Nafion 112). These assemblies were hot pressed under conditions of 140° C. and 100 kg/cm² for 3 minutes, then the Teflon sheets were peeled off to thereby form the catalyst layer-electrolyte film laminates 14 to 19. In the same way as in Example 1, the amounts of the catalyst layer inks were adjusted so that the Pt content of the cathodes became 0.07 mg/cm² and the Pt content of the anodes became 0.04 mg/cm².

Further, in the same way as in Example 1, carbon paper treated in advance by PTFE was bonded to obtain each of the MEA14 to MEA19.

The obtained MEA14 to MEA19 were measured for cell performance under conditions similar to Example 1.

TABLE 4

| | Anode | | | Cathode | | | |
|---|---|---|---|---|---|---|---|
| MEA no. | Type of catalyst-carrying carbon material | Pt carrying rate of catalyst mass % | Content of gas-diffusing carbon material mass % | Type of catalyst-carrying carbon material | Pt carrying rate of catalyst mass % | Gas-diffusing carbon material | | Current density at 0.6 V (mA/cm²) |
| | | | | | | Type | Content mass % | |
| Ex. MEA14 | D | 30 | 0 | F | 50 | A | 25 | 659 |
| MEA15 | D | 30 | 0 | F | 50 | B | 25 | 1087 |
| MEA16 | D | 30 | 0 | F | 50 | C | 25 | 1028 |
| MEA17 | D | 30 | 0 | F | 50 | D | 25 | 781 |
| MEA18 | D | 30 | 0 | F | 50 | E | 25 | 639 |
| MEA19 | D | 30 | 0 | F | 50 | F | 25 | 328 |

Table 4 shows the results of measurement of the cell performance of MEA14 to MEA19 together with the compositions of the catalyst layers. As shown in Table 4, MEA14 to MEA19 of the examples of the present invention, where gas-diffusing carbon materials were included in the cathodes, exhibited superior cell performances compared with the MEA7 of the comparative example where a gas-diffusing carbon material was not included.

Further, among the MEA14 to MEA19 of the examples, MEA14 to MEA18, where the gas-diffusing carbon materials had amounts of adsorption of water vapor at 25° C. and a relative humidity of 90% of 100 ml/g or less, exhibited particularly superior cell performances. Further, MEA15 and 16, where the gas-diffusing carbon materials had amounts of adsorption of water vapor at 25° C. and a relative humidity of 90% of 1 ml/g to 50 ml/g, exhibited extremely superior cell performances.

Example 4

Coal-based raw coke material was treated by so-called water vapor activation treatment in a heating furnace warmed to 800° C. to 1100° C. for 2 hours to 3 hours while running nitrogen gas containing a certain amount of water vapor to prepare activated carbon.

Further, to control the oxygen content, this was heat treated for reduction in a nitrogen gas atmosphere containing 10 vol % to 30 vol % of hydrogen at 500° C. to 900° C. for 1 hour Table 5 shows the various physical properties of a series of activated carbon prepared by the above-mentioned method. The values of these physical properties were measured by the above-mentioned methods.

TABLE 5

| Type of carbon material | Steam adsorption ml/g | $S_{BET}$ m²/g | $S_{micro}/S_{total}$ | Micropore diameter nm | Micropore volume ml/g | Oxygen content mass % | DBP oil absorption ml/100 g | Pt particle size nm |
|---|---|---|---|---|---|---|---|---|
| Activated carbon 1 | 195.3 | 1550 | 0.55 | 0.73 | 0.311 | 4.93 | 35 | 1.9 |
| Activated carbon 2 | 183.3 | 1640 | 0.52 | 0.85 | 0.362 | 4.33 | 45 | 1.7 |
| Activated carbon 3 | 165.1 | 1890 | 0.68 | 1.18 | 0.758 | 4.62 | 75 | 1.7 |
| Activated carbon 4 | 205.3 | 2310 | 0.85 | 1.32 | 1.300 | 3.55 | 70 | 1.6 |
| Activated carbon 5 | 166.6 | 1750 | 0.95 | 1.05 | 0.873 | 3.81 | 60 | 1.8 |
| Activated carbon 6 | 45.6 | 1320 | 0.41 | 0.75 | 0.203 | 4.51 | 35 | 3.8 |
| Activated carbon 7 | 31.9 | 1650 | 0.31 | 0.55 | 0.141 | 10.5 | 25 | 4.5 |
| G | 46.6 | 225 | 0.12 | 0.55 | 0.01 or less | 1.56 | 220 | 5.3 |
| H | 29.6 | 80 | 0.09 | 0.45 | 0.01 or less | 0.96 | 170 | 6.7 |

Each of these activated carbons was processed as follow to make it carry platinum fine particles. 150 ml of distilled water in a flask was charged with 0.5 g of the carbon material used for the carrier and hexachloroplatinic (IV) acid to give a mass ratio of the platinum to the carrier of ratio 1:1, the mixture was sufficiently dispersed by ultrasonic waves, then the mixture was held in a oil bath in the boiling state and a reducing agent comprised of formaldehyde was added dropwise at a constant speed over 3 to 10 hours.

After finishing the dropping, the mixture was separated by filtration by a membrane filter, then the recovered matter was again dispersed in distilled water and separated by filtration. This operation was repeated three times. The result was dried in vacuo at 100° C. to obtain a catalyst for an electrode.

The amount of platinum carried on the catalyst was quantitatively analyzed by dissolving this in hot aqua regia and measuring it by plasma spectrometry, whereupon it was found to be 50 mass % in the case of each sample.

The activated carbon defined by the present invention, despite having a high density of 50 mass % compared with other activated carbon or carbon black, had a particle size of 2.0 nm or less, so clearly has a smaller Pt particle size and is deemed more excellent as a carrier.

Each of the series of platinum catalyst-carrying carbon materials and a gas-diffusing carbon material comprised of the carbon black B of Example 1 were used by the same method as Example 1 to prepare cathode-use catalyst layer-Teflon sheet laminates.

Each of these prepared cathode-use catalyst layer-Teflon sheet laminates and an anode-use catalyst layer-Teflon sheet laminate A prepared in Example 1 were used to sandwich an electrolyte film (Nafion 112). These assemblies were hot pressed under conditions of 140° C. and 100 kg/cm$^2$ for 3 minutes, then the Teflon sheets were peeled off to thereby form the catalyst layer-electrolyte film laminates. These were prepared so that the cathode had a Pt content of 0.08 mg/cm$^2$ and the anode had a Pt content of 0.05 mg/cm$^2$.

Further, in the same way as in Example 1, each was bonded with carbon paper treated in advance by PTFE to make it hydrophobic to obtain MEAs. The obtained MEAs were measured for cell performance under conditions similar to Example 1.

In this study, to evaluate the changes in particle sizes of catalysts as deterioration, it is necessary make the particle sizes of the platinum fine particles before deterioration accurately match. The catalysts were prepared to have platinum carrying rates of 30 mass % and diameters of the platinum fine particles of 2.3 nm. Table 7 shows the physical properties of the series of carbon materials and the catalysts particles sizes. The particle sizes of the catalysts used were values measured by X-ray diffraction.

The five types of catalysts of Table 7 were used to prepare MEAs by a method similar to Example 4. The MEAs were prepared so that the cathodes had Pt contents of 0.08 mg/cm$^2$ and the anodes had Pt contents of 0.05 mg/cm$^2$. The obtained HEAs were attached to cells and used for evaluation by a method similar to Example 1.

The catalyst life was evaluated by the ratio of the surface areas of the platinum used for the cathode before deterioration and after deterioration operation. That is, if the surface area of the platinum does not change at all due to the deterioration operation, the rate of deterioration is evaluated as 0%, while if the surface area of the platinum after deterioration operation becomes half of that before deterioration, the rate of deterioration is evaluated as 50%.

The surface area of platinum of a cathode was evaluated by the following method. The anode was supplied with wet hydrogen gas, the cathode was supplied with wet argon gas,

TABLE 6

|  | MEA no. | Anode | | | cathode | | | | Current density at 0.6 V (mA/cm$^2$) |
|---|---|---|---|---|---|---|---|---|---|
|  |  | Type of catalyst-carrying carbon material | Pt carrying rate of catalyst mass % | Content of gas-diffusing carbon material mass % | Type of catalyst-carrying carbon material | Pt carrying rate of catalyst mass % | Gas-diffusing carbon material | | |
|  |  |  |  |  |  |  | Type | Content mass % | |
| Inv. ex. | MEA20 | D | 30 | 0 | Activated carbon 1 | 50 | B | 20 | 1028 |
|  | MEA21 | D | 30 | 0 | Activated carbon 2 | 50 | B | 20 | 1051 |
|  | MEA22 | D | 30 | 0 | Activated carbon 3 | 50 | B | 20 | 1025 |
|  | MEA23 | D | 30 | 0 | Activated carbon 4 | 50 | B | 20 | 1013 |
|  | MEA24 | D | 30 | 0 | Activated carbon 5 | 50 | B | 20 | 1030 |
| Comp. ex. | MEA25 | D | 30 | 0 | Activated carbon 6 | 50 | B | 20 | 941 |
|  | MEA26 | D | 30 | 0 | Activated carbon 7 | 50 | B | 20 | 929 |
|  | MEA27 | D | 30 | 0 | G | 50 | B | 20 | 961 |
|  | MEA28 | D | 30 | 0 | H | 50 | B | 20 | 936 |

Table 6 shows the results of cell performance of the prepared MEAs. The MEAs using platinum catalysts having the activated carbon defined in the present invention as carrier were observed to clearly exhibit superior output characteristics compared with the MEAs of the activated carbon and carbon black used for comparison.

Example 5

To study how the catalyst life is improved by using the activated carbon defined in the present invention for a carrier, the five types of carbon materials shown in Table 7 among the carbon materials used in Example 4 were used to carry platinum fine particles by a method similar to Example 4.

and the cell was cycled 10 times by a 50 mV/sec scan rate in a range of cell voltage of 0.05V to 0.9V to measure the cyclic voltammogram.

The wetting conditions and the cell temperature were made the same as in Example 1. The number of hydrogen atoms disassociated from the area of the so-called hydrogen disassociation wave of the 10th cycle graph was calculated and the known average area which one hydrogen atom occupies on the platinum surface was used to find the surface area of the platinum from the number of hydrogen atoms (see Fujijima, Aizawa, Inoue ed., *Electrochemical Measurement Methods (I)*, Gihodo Shuppan, Chapter 4, 4.4. Pretreatment of Electrodes and Electrode Surface Area).

In this evaluation, each MEA was attached, then the cyclic voltammogram was measured. Next, the gas of the cathode was changed to pure oxygen, the cell voltage was held at OCV (open voltage no load) for 15 seconds, then a load was applied so that the cell voltage became a constant 0.5V and this state was held for 15 seconds. This operation was repeated for 3000 cycles.

After this, the gas of the cathode was again changed to argon and the surface area of the platinum was found under the same conditions as before deterioration. The rate of deterioration was the surface area of the platinum after deterioration divided by the value before deterioration expressed as a %.

TABLE 7

|  | Carbon material | Pt particle size nm | Rate of deterioration % |
|---|---|---|---|
| Inv. ex. | Activated carbon 1 | 2.26 | 41 |
|  | Activated carbon 2 | 2.29 | 40 |
|  | Activated carbon 4 | 2.26 | 37 |
| Comp. ex. | Activated carbon 6 | 2.28 | 55 |
|  | Activated carbon 7 | 2.30 | 59 |
|  | G | 2.29 | 63 |
|  | H | 2.32 | 69 |

As clear from Table 7, the activated carbon defined in the present invention clearly suffers from less of a degree of deterioration than a platinum catalyst using another activated carbon or usual carbon black for the carrier.

Example 6

In this example, as catalyst carriers, including the comparative examples, carbon materials with different pore volumes, nitrogen adsorption specific areas, DBP oil absorptions, and amounts of adsorption of water vapor were used. Table 8 shows the values of the various physical properties of the carbon materials used.

The above-mentioned physical properties were measured by the above-mentioned methods. The carbon materials of Table 8 were used as catalyst carriers to prepare platinum-carrying catalysts by the following method.

Each of the catalyst-carrying carbon materials comprised of the carbon materials of Table 8 was dispersed in water. While holding this at 50° C. and stirring, a hydrogen hexachloroplatinate aqueous solution and formaldehyde aqueous solution were added to obtain a catalyst precursor.

Each catalyst precursor was filtered, rinsed, and is dried, then reduced in a 100% $H_2$ stream at 300° C. for 3 hours to prepare a Pt catalyst comprised of the catalyst-carrying carbon material carrying 20 mass % of Pt.

The Pt particle sizes of the obtained platinum catalysts are shown in Table 8. As shown in Table 8, the carbon materials I, O, and S had extremely large crystal grain sizes and therefore are not expected to have that high performances as fuel cell catalysts.

Each of these 12 types of catalyst-carrying carbon material and a gas-diffusing carbon material comprised of the carbon black B of Example 1 were used by the same method as in Example 1 to prepare a cathode use catalyst layer-Teflon sheet laminate.

Each of these prepared cathode-use catalyst layer-Teflon sheet laminates and an anode-use catalyst layer-Teflon sheet laminate A prepared in Example 1 were used to sandwich an electrolyte film (Nafion 112). These assemblies were hot pressed under conditions of 140° C. and 100 kg/cm² for 3 minutes, then the Teflon sheets were peeled off to thereby form the catalyst layer-electrolyte film laminates. These were prepared so that the cathode had a Pt content of 0.08 mg/cm² and the anode had a Pt content of 0.05 mg/cm².

Further, the same procedure was performed as in Example 1 to bond carbon paper treated for hydrophobicity in advance by PTFE to obtain MEA29 to MEA40.

The obtained MEA29 to MEA40 were measured for cell performance under conditions similar to Example 1.

TABLE 8

| Type of carbon material | Amount of adsorption of water vapor ml/g | $S_{BET}$ m²/g | $S_{micro}/S_{total}$ | Micropore dia. nm | Micropore vol. ml/g | Oxygen content mass % | DBP oil absorption ml/100 g | Pt particle size nm |
|---|---|---|---|---|---|---|---|---|
| I | 25.3 | 72 | 0.41 | 0.68 | 0.01 | 1.12 | 170 | 6.3 |
| J | 78.5 | 1370 | 0.39 | 0.63 | 0.17 | 0.78 | 521 | 2.0 |
| K | 82.9 | 796 | 0.73 | 0.69 | 0.2 | 1.23 | 360 | 2.5 |
| L | 113.5 | 1436 | 0.77 | 0.71 | 0.39 | 0.96 | 313 | 2.0 |
| M | 103.5 | 950 | 0.35 | 0.66 | 0.11 | 0.86 | 380 | 2.4 |
| N | 48.3 | 227 | 0.48 | 0.92 | 0.05 | 2.1 | 219 | 3.5 |
| O | 46.1 | 195 | 0.25 | 0.81 | 0.02 | 0.98 | 127 | 4.5 |
| P | 41.6 | 460 | 0.40 | 0.77 | 0.07 | 1.63 | 150 | 3.0 |
| Q | 43.9 | 265 | 0.37 | 0.82 | 0.04 | 1.22 | 119 | 3.5 |
| R | 39.8 | 583 | 0.11 | 0.99 | 0.03 | 1.41 | 95 | 2.8 |
| S | 37.7 | 40 | 0.52 | 0.97 | 0.01 | 0.82 | 159 | 7.2 |
| T | 68.8 | 1582 | 0.69 | 0.71 | 0.39 | 1.26 | 515 | 1.8 |

TABLE 9

| | | Anode | | | Cathode | | | |
| | MEA no. | Type of catalyst-carrying carbon material | Pt carrying rate of catalyst mass % | Gas-diffusing carbon material content mass % | Type of catalyst-carrying carbon material | Pt carrying rate of catalyst mass % | Gas-diffusing carbon material Type | Content mass % | Current density at 0.6 V (mA/cm$^2$) |
|---|---|---|---|---|---|---|---|---|---|
| Comp. ex. | MEA29 | D | 30 | 0 | I | 20 | B | 20 | 969 |
| Inv. Ex. | MEA30 | D | 30 | 0 | J | 20 | B | 20 | 1067 |
| | MEA31 | D | 30 | 0 | K | 20 | B | 20 | 1034 |
| | MEA32 | D | 30 | 0 | L | 20 | B | 20 | 1028 |
| | MEA33 | D | 30 | 0 | M | 20 | B | 20 | 1038 |
| Comp. ex. | MEA34 | D | 30 | 0 | N | 20 | B | 20 | 987 |
| | MEA35 | D | 30 | 0 | O | 20 | B | 20 | 961 |
| | MEA36 | D | 30 | 0 | P | 20 | B | 20 | 981 |
| | MEA37 | D | 30 | 0 | Q | 20 | B | 20 | 982 |
| | MEA38 | D | 30 | 0 | R | 20 | B | 20 | 974 |
| | MEA39 | D | 30 | 0 | S | 20 | B | 20 | 803 |
| Inv. Ex. | MEA40 | D | 30 | 0 | T | 20 | B | 20 | 1104 |

Table 9 shows the results of the cell performance of the 12 types of MEAs prepared. The MEA30 to MEA33 and MEA40 of the present invention exhibited superior cell characteristics compared with the comparative examples.

Among these, the MEA40 using a carbon material T having a volume of pores of 2 nm or less size of 0.3 ml/g or more and a nitrogen adsorption specific area of 800 m$^2$/g or more and further having a DBP oil absorption of 400 ml/g or more was particularly superior in load characteristics.

Example 7

Method of Synthesis of Transition Metal Complex>

The method of synthesis of the N4-chelate type transition metal complex defined in the present invention is shown below.

Synthesis of complex 1: The method described in the Document (R. H. Holm, *J. Am. Chem. Soc.*, Vol. 94, p. 4529 (1972)) was used to synthesize a cobalt (II) complex of 5,7,12,14-tetramethyl-1,4,8,11-tetraazacyclotetradeca-2,4,6,9,11,13-hexaene (abbreviated as "complex 1"). The yield was 12%.

Synthesis of complex 2: The method described in the Documents ((a) T. Hayashi, *Bull. Chem. Soc. Jpn.*, Vol. 54, p. 2348 (1981), (b) R. H. Holm, *Inorg. Syn.*, Vol. 11, p. 72, (1968)) was used to synthesize a cobalt (ITI) complex of 5,7,12,14-tetramethyl-1,4,8,11-tetraazacyclotetradeca-4,6,11,13-tetraene (abbreviated as "complex 2"). The yield was 8%.

<Preparation of Catalyst>

A total of three types of materials were used for the carbon material carrier for the catalyst: the carbon material F used in Example 1, the carbon material 3 used in Example 4, and the activated carbon 4. Hydrogen hexachloroplatinate 6-hydrate (made by Wako Pure Chemical Industries) was weighed so as to give a predetermined mass % and was diluted by water to a suitable amount. Each of the carbon materials used as the carrier were added to such an aqueous solution and sufficiently stirred, then this was dispersed by an ultrasonic wave generator.

After this, an evaporator was used to dry each dispersion to a solid to prepare a carrier carrying the precursor.

Each precursor-carrying carrier was heated to 300° C. in an electric furnace through which a hydrogen/argon mixed gas was circulated (ratio of hydrogen gas: 10 to 50 vol %) so as to reduce the hydrogen hexachloroplatinate. The Pt particle size was 2.0 to 2.3 nm.

Each of the above transition metal complexes was weighed to 1 mass % converted to transition metal element and a suitable amount of N,N'-dimethyl formamide (reagent special grade) or pyridine (reagent special grade) was added. The above-mentioned platinum-containing carbon materials (Pt—C) was added to this solution and sufficiently stirred, then was dispersed using an ultrasonic wave generator.

Each dispersion was held in temperature by a 70° C. oil bath and refluxed for 8 hours or more (under flow of argon), then was poured, while stirring, into distilled water of five or more times the dispersion to immobilize the transition metal complex on the Pt—C.

After this, each catalyst was separated by vacuum filtration and again washed by distilled water of a temperature of 60° C. or so. The catalyst was obtained by vacuum filtration and dried in vacuo at 100° C.

This was further treated in an argon gas atmosphere at 700° C. for 1 hour to obtain an evaluation use catalyst.

The transition metal complexes used in the examples were the above complex 1, complex 2, and a cobalt (II) complex of 5,10,15,20-tetraphenylpolyporphyrin (abbreviated as "CoTPP").

Note that catalysts carrying only transition metal complexes were prepared by omitting the above-mentioned platinum carrying process and performing the transition metal complex carrying process, while a catalyst carrying on platinum was prepared by omitting the transition metal complex carrying process and performing only the platinum carrying process so as to prepare the respective catalysts.

<Method of Evaluation of Catalyst Activity>

(1) Preparation of Samples for Evaluation

Each catalyst was crushed in advance by a mortar. 15 mg of the catalyst powder, 300 mg of a polymer solid electrolyte solution (ElectroChem, EC-NS-05; Nafion 5 mass % solution), and 300 mg of ethanol were placed in a sample bottle and stirred for 15 minutes by a stirrer to prepare a sufficiently mixed slurry.

(2) Preparation of Test Electrodes

A disk electrode of a rotary ring-disk electrode was coated and dried with the above-mentioned slurry to form a test electrode. The disk electrode is a column of a diameter of 6 mm made by glassy carbon. The sample was coated on the bottom surface. The amount of coating was adjusted to 0.03 mg.

Further, the ring electrode is a cylinder of an inside diameter of 7.3 mm and an outside diameter of 9.3 mm made by platinum. The rotary ring-disk electrode is structured with the disk electrode and ring electrode positioned concentrically and with the disk electrode and ring electrode insulated from each other and the outside of the ring electrode insulated by Teflon resin.

(3) Method of Evaluation

A rotary ring-disk evaluator (RRDE-1) made by Nikko Keisoku was used to evaluate the electrochemical activity of the catalysts. For the electrochemical evaluation, two Solatron SI1287 units were used. The ring electrode and the disk electrode were independently controlled for bipolar measurement.

For the electrolyte, a 0.1N sulfuric acid aqueous solution was used. For the reference electrode, an SCE electrode was used, while for the counter electrode, a Pt plate was used in the cell. The evaluation conditions were as follows:

In the state of the electrolyte saturated with oxygen by bubbling of oxygen gas, the potential of the disk electrode of the electrode rotating at 2500 rpm was changed from 1.0V (SCE standard) to −0.2V at a speed of 10 mV/sec. At that time, the potential of the ring electrode was held at 1.1V (SCE standard). The changes of the currents flowing through the disk electrode and the ring electrode over time were measured to obtain plots of the disk current and ring current with respect to the potential of the disk electrode.

(4) Method of Evaluation of Overvoltage

The potential (E1/2) when the current value became half of the saturated current value was read from the plot of the disk potential vs. disk current. The $\Delta E1/2 = E1/2 - E1/20$ of each catalyst of the examples and comparative examples was evaluated based on the potential E1/20 when the current value became half of the saturated current value of the catalyst EC10PTC made by ElectroChem of the U.S. (catalyst comprised of carbon black carrying 10 mass % of platinum).

That is, at $\Delta E1/2 = 0$, the overvoltage is the same as EC10PTC. If $\Delta E1/2 > 0$, the overvoltage is smaller than EC10PTC. This corresponds to a high catalyst activity.

(5) Method of Evaluation of Four-Electron Reaction Rate

The four-electron reaction rate η was calculated based on the following equation from the plots of the ring current and disk current with respect to the disk potential.

$$\eta(\%) = [Id - (Ir/n)] / [Id + (Ir/n)]$$

where, Id indicates the disk current, Ir indicates the ring current, and n indicates the rate of the ring electrode trapping the disk reaction product.

The experimental method of measurement of the trapping rate was evaluated in accordance with the "Fujijima et al., *Electrochemical Measurement Methods (II)*, Gihodo Shuppan (1991)". As a result, in the electrodes used for the examples, n=0.36.

Further, the η changes in accordance with the disk potential (the poorer the potential, the smaller the η). In the evaluation, the η when the disk potential is 0V (SCE standard) is employed so that the difference of η by the catalyst becomes clear.

Table 11 shows the type of the transition metal, the amount of the platinum carried, and, as indicators of the catalyst activity, the overcurrent value $\Delta E1/2$ and the four-electron reaction rate η.

TABLE 11

| | | Type of metal complex | Metal complex Co carrying amount, mass % | Pt carried amount, mass % | Carrier carbon material | η % | $\Delta E_{1/2}$ mV |
|---|---|---|---|---|---|---|---|
| Ex. | Catalyst 1 | Complex 1 | 0.5 | 0 | F | 93 | 2 |
| | Catalyst 2 | Complex 1 | 0.5 | 0 | Activated carbon 3 | 95 | 7 |
| | Catalyst 3 | Complex 1 | 0.5 | 6 | F | 99 | 28 |
| | Catalyst 4 | Complex 2 | 0.5 | 6 | F | 99 | 24 |
| | Catalyst 5 | Complex 1 | 0.5 | 6 | Activated carbon 3 | 99 | 33 |
| | Catalyst 6 | Complex 1 | 0.5 | 6 | Activated carbon 4 | 99 | 43 |
| | Catalyst 7 | CoTPP | 0.5 | 0 | F | 82 | −12 |
| | Catalyst 8 | None | None | 12 | F | 99 | 13 |

From the results of Table 11, a transition metal of the specific structure defined in the present invention is recognized as being excellent in both catalyst activity in an oxygen reduction reaction and four-electron reaction rate.

Further, a complex catalyst comprised of a transition metal complex defined in the present invention and platinum combined together clearly exhibits a superior catalyst characteristic compared with platinum alone or a transition metal complex alone. A coordinated effect of the transition metal complex and platinum is recognized.

Further, the effect of the carrier is also recognized. By using activated carbon having a large specific surface area for the carrier, a superior catalyst activity not obtainable by an ordinary carbon carrier can be observed.

Next, each of five types of catalysts of a catalyst 3, catalyst 4, catalyst 5, catalyst 6, and catalyst 8 and a gas-diffusing carbon material comprised of the carbon black B of Example 1 were used in the same method as in Example 1 to prepare a cathode-use catalyst layer-Teflon sheet laminate.

Each of these prepared cathode-use catalyst layer-Teflon sheet laminates and an anode-use catalyst layer-Teflon sheet laminate A prepared in Example 1 were used to sandwich an electrolyte film (Nafion 112). These assemblies were hot pressed under conditions of 140° C. and 100 kg/cm² for 3 minutes, then the Teflon sheets were peeled off to thereby form the catalyst layer-electrolyte film laminates. These were prepared so that the anodes had a Pt content adjusted to 0.03 mg/cm².

They were also prepared so that the cathodes had a Pt content of 0.03 mg/cm² in the case of the catalyst 3, catalyst 4, catalyst 5, and catalyst 6 and 0.06 mg/cm² in the case of the catalyst 8.

Further, these were bonded with carbon paper treated in advance by PTFE to make it hydrophobic to obtain the MEA41 to MEA45 in the same way as Example 1.

The obtained MEA41 to MEA45 were measured for cell performance under conditions similar to Example 1.

TABLE 12

|  | MEA no. | Anode | | | Cathode | | | | Current density at 0.6 V (mA/cm²) |
|---|---|---|---|---|---|---|---|---|---|
|  |  | Type of catalyst-carrying carbon material | Pt carrying rate of catalyst mass % | Content of gas-diffusing carbon material mass % | Type of catalyst | Pt carrying rate of catalyst mass % | Gas-diffusing carbon material | | |
|  |  |  |  |  |  |  | Type | Content mass % |  |
| Example | MEA41 | D | 30 | 0 | Catalyst 3 | 6 | B | 20 | 460 |
|  | MEA42 | D | 30 | 0 | Catalyst 4 | 6 | B | 20 | 425 |
|  | MEA42 | D | 30 | 0 | Catalyst 5 | 6 | B | 20 | 625 |
|  | MEA44 | D | 30 | 0 | Catalyst 6 | 6 | B | 20 | 705 |
|  | MEA45 | D | 30 | 0 | Catalyst 8 | 6 | B | 20 | 385 |

Table 12 shows the results of cell performance of the five types of MEAs prepared. The MEA41 to MEA44 exhibited superior cell characteristics regardless of the amount of platinum of the cathode being half that of MEA45.

Example 8

Three types of carbon black U, V, and W were prepared in the same way as shown in the examples of the gas diffusion electrodes of the present invention. Table 13 shows the amount of adsorption of water vapor, DBP oil absorption (X ml/100 g), nitrogen adsorption specific area (Y m²/g), and ratio X/Y of the DBP oil absorption and nitrogen adsorption specific area of each type of the carbon black.

TABLE 13

| Type of carbon black | Amount of adsorption of water vapor ml/g | DBP oil absorption (X) ml/100 g | Nitrogen adsorption specific area (Y) m²/g | X/Y |
|---|---|---|---|---|
| U | 8.96 | 232 | 128 | 1.81 |
| V | 59.8 | 230 | 225 | 1.02 |
| W | 127 | 536 | 1370 | 0.39 |

<Preparation of Gas Diffusion Layer>

Commercially available carbon cloth (made by Electro-Chem, EC-CC1-060) was prepared, dipped in a Teflon dispersion diluted to 5%, then dried and further raised in temperature in an argon stream to 340° C. to prepare a gas diffusion fiber layer. Further, 99 g of ethanol was added to 1 g of carbon black U, then the carbon black was crushed by a ball mill to prepare a primary dispersion.

After this, 0.833 g of a 30% Teflon dispersion was added dropwise a little at a time to the primary dispersion while stirring to prepare a micropore layer slurry.

The slurry was spray coated on the previously prepared gas diffusion fiber layer and dried in an argon stream at 80° C., then the temperature was raised to 340° C. to thereby prepare a gas diffusion layer CC-U comprised of a stacked gas diffusion fiber layer and micropore layer.

As a comparison, a gas diffusion layer CC of carbon cloth not coated with a micropore layer was also prepared.

Each of the carbon black V and W of Table 13 was dispersed in a hydrogen hexachloroplatinate aqueous solution as a catalyst-carrying carbon material. While holding this at 50° C. and stirring, hydrogen peroxide was added, then an $Na_2S_2O_4$ aqueous solution was added to obtain a catalyst precursor. Each catalyst precursor was filtered, rinsed, dried, then reduced in a 100% H2 stream at 300° C. for 3 hours to thereby prepare two types of Pt catalysts comprised of the catalyst-carrying carbon material carrying 20 mass % of Pt.

These two types were placed in containers. A 5% Nafion solution (made by Aldrich) was added to each of these in an argon stream to give a mass of the Nafion solid of two times the mass of the platinum catalyst, this was lightly stirred, then the catalyst was crushed by ultrasonic waves, and butyl acetate was added while stirring to give a solid concentration of the Pt catalyst and Nafion combined of 6 mass % so as to thereby prepare two types of catalyst slurry.

The carbon black U shown in Table 13 was placed in a separate container, butyl acetate was added to give carbon black of 6 mass %, and the carbon black was crushed by ultrasonic waves to prepare a carbon black slurry.

Each of the two types of the above prepared catalyst slurries and the carbon material slurry were mixed by a mass ratio of 8:2, then sufficiently stirred to prepare two types of catalyst layer slurry.

Each of the two types of catalyst layer slurry was spray coated on a gas diffusion layer CC-U and dried at 80° C. in an argon stream for 1 hour to prepare two types of gas diffusion electrodes of the present invention containing the carbon black V and W as the catalyst-carrying carbon material and the carbon black U as the gas-diffusing carbon material.

Further, for comparison, gas diffusion electrodes comprised of carbon cloth CC not coated with a micropore layer and catalyst layers containing the carbon black W as the catalyst-carrying carbon material and the carbon black U as the gas-diffusing carbon material were obtained as comparative examples.

Note that the spray and other conditions were set so that the electrodes had amounts of platinum used of 0.10 mg/cm². The amounts of platinum used were found by measuring the dry masses of the electrodes before and after spray coating and calculating the amounts from the difference.

Further, two 2.5 cm square pieces were cut out from each of the obtained solid polymer type fuel cell electrodes, two of the same type of electrodes were used to sandwich an electrolyte film (Nafion 112), and the assemblies were hot pressed at 130° C. by a total pressure of 0.625 t for 3 minutes to prepare the MEA46 to MEA48.

The obtained MEAs were attached to fuel cell measurement devices and measured for cell performances. The cell performances were measured by changing the voltage between cell terminals in stages from the open voltage (usually 0.9V to 1.0V) to 0.2V and measuring the current density when voltages of 0.8V and 0.5V were flowing between the cell terminals.

As the gas, the cathode was supplied with air and the anode with pure hydrogen to give rates of utilization of 50% and 80%. These gases were adjusted in pressure to 0.1 MPa by a back pressure valve provided downstream from the cell. The cell temperature was set at 80° C., and the supplied air and pure hydrogen were bubbled through distilled water warmed to 80° C. and 90° C. to wet them.

Table 14 shows the obtained three types of MEA and the results of their cell performance. As shown in Table 14, the MEAs of the present invention exhibited superior characteristics.

In particular, the MEA46 and MEA47 having micropore layers containing carbon black with an amount of adsorption of water vapor at 25° C. and a relative humidity of 90% of 100 ml/g or less as main ingredients in the gas diffusion layers exhibited superior characteristics compared with MEA48 without the micropore layer.

Among these, the MEA47 including a catalyst-carrying carbon material having an amount of adsorption of water vapor at 25° C. and a relative humidity of 90% of 100 ml/g or more in the catalyst layer exhibited extremely superior performance.

350° C. to thereby prepare two types of gas diffusion layers comprised of stacked gas diffusion fiber layers and micropore layers.

Table 15 shows the physical properties of the carbon black used for the micropore layers all together.

TABLE 15

| Carbon black used for micropore layer | Nitrogen adsorption specific area (Y) $m^2/g$ | DBP oil absorption (X) ml/100 g | X/Y | Amount of adsorption of water vapor ml/g |
|---|---|---|---|---|
| AA | 78 | 160 | 2.05 | 4.5 |
| AB | 219 | 221 | 1.01 | 62 |

For the catalyst, a platinum catalyst having the activated carbon with the physical properties shown in Table 16 was used as the carrier. This activated carbon was processed as follows to carry the platinum fine particles.

150 ml of distilled water in a flask was charged with 0.5 g of activated carbon as the catalyst carrier and hexachloroplatinic (IV) acid to give a mass ratio of the platinum to the carrier of ratio 1:1, the mixture was sufficiently dispersed by ultrasonic waves, then the mixture was held in a oil bath in the boiling state and a reducing agent comprised of formaldehyde was added dropwise at a constant speed.

After finishing the dropping, the mixture was separated by filtration by a membrane filter, then the recovered matter was again dispersed in distilled water and separated by filtration. This operation was repeated three times. The result was dried in vacuo at 100° C. to obtain a catalyst for an electrode.

TABLE 14

| Type of MEA | Type of gas diffusion layer | Type of catalyst-carrying carbon material contained in catalyst layer | Type of gas-diffusing carbon material contained in catalyst layer | Current density (mA/cm$^2$) Cell voltage 0.8 V | Cell voltage 0.5 V | Remarks |
|---|---|---|---|---|---|---|
| MEA46 | CC-U | V | U | 153 | 1260 | Ex. |
| MEA47 | CC-U | W | U | 178 | 1330 | |
| MEA48 | CC | W | U | 68 | 1100 | |

Example 9

A carbon cloth (made by ElectroChem, EC-CC1-060) was prepared, dipped in a Teflon dispersion diluted to 5%, then dried and further raised in temperature in an argon stream to 320 to 350° C. to prepare a gas diffusion fiber layer.

Further, 99 g of ethanol was added to 1 g of each the two types of carbon black of Table 15, then the carbon materials were crushed by a ball mill to prepare primary dispersions.

After this, 0.833 g of a 30% Teflon dispersion was added a little at a time to each primary dispersion to prepare a micropore layer slurry.

Each slurry was spray coated on one surface of a previously prepared gas diffusion fiber layer and dried in an argon stream at 80° C., then the temperature was raised to 320 to The amount of platinum carried on the catalyst was quantitatively analyzed by dissolving this in hot aqua regia and measuring it by plasma spectrometry, whereupon it was found to be 50 mass %.

The Pt particle size of the obtained platinum catalyst is shown in Table 16. The particle size of the Pt fine particles was estimated using the method of Scherrer from the half value of the (111) peak of platinum obtained by an X-ray diffraction device (made by Rigaku Corporation, Model RAD-3C).

The activated carbon defined by the present invention, despite having a high density of 50 mass % compared with other activated carbon or carbon black, had a particle size of 2.0 nm or less, so clearly has a smaller Pt particle size and is deemed more excellent as a carrier.

TABLE 16

| Carbon material | $S_{EST}$ m²/g | $S_{micro}/S_{total}$ | Micropore diameter nm | Oxygen content mass % | DBP oil absorption ml/100 g | Pt particle size nm |
|---|---|---|---|---|---|---|
| Activated carbon | 2310 | 0.85 | 1.32 | 3.5 | 70 | 1.6 |

A 5% Nafion solution (made by Aldrich) was added to this platinum catalyst in an argon stream to give a mass of the Nafion solid of two times the mass of the platinum catalyst, this was lightly stirred, then the catalyst was crushed by ultrasonic waves, and butyl acetate was added while stirring to give a solid concentration of the Pt catalyst and Nafion combined of 6 mass % so as to prepare the catalyst slurry.

The carbon material AA shown in Table 16 was placed in a separate container, butyl acetate was added to give a carbon material of 6 mass %, and the carbon material was crushed by ultrasonic waves to prepare a carbon material slurry. The above prepared catalyst slurry and carbon material slurry were mixed by a mass ratio of 8:2, then sufficiently stirred to prepare a catalyst layer slurry.

The catalyst layer slurry was spray coated on the micropore layer sides of the above two types of the gas diffusion layers and dried at 80° C. in an argon stream for 1 hour to prepare two types of solid polymer type fuel cell electrodes of the present invention.

Note that the spray and other conditions were set so that the electrodes had amounts of platinum used of 0.10 mg/cm². The amounts of platinum used were found by measuring the dry masses of the electrodes before and after spray coating and calculating the amounts from the difference.

Further, two 2.5 cm square pieces were cut out from each of the obtained solid polymer type fuel cell electrodes, two of the same type of electrodes were used to sandwich an electrolyte film (Nafion 112) so that the catalyst layers contacted the electrolyte film, and the assemblies were hot pressed at 130° C. by a total pressure of 0.625 t for 3 minutes to prepare the MEA49 and MEA50.

The obtained HEAs were attached to fuel cell measurement devices and measured for cell performances.

The cell performances were measured by changing the voltage between cell terminals in stages from the open voltage (usually 0.9V to 1.0V) to 0.2V and measuring the current density when voltages of 0.8V and 0.5V were flowing between the cell terminals.

As the gas, the cathode was supplied with air and the anode with pure hydrogen to give rates of utilization of 50% and 80%. These gases were adjusted in pressure to 0.1 MPa by a back pressure valve provided downstream from the cell. The cell temperature was set at BOOC, and the supplied air and pure hydrogen were bubbled through distilled water warmed to 80° C. and 90° C. to wet them.

Table 17 shows the results of the cell performance of the obtained MEA49 and MEA50. The MEA49 and MEA50 provided with the micropore layers exhibited excellent current density of the cell voltage of 0.8V and 0.5V.

In particular, the MEA49 using carbon black A having an amount of adsorption of water vapor of 100 ml/g or less and a ratio X/Y of the DBP oil absorption X and the nitrogen adsorption specific area Y of 1.0 or more for the intermediate layer exhibited extremely superior cell performance.

TABLE 17

| Type of MEA | Carbon black used for micropore layer | Current density (mA/cm²) Cell voltage 0.8 V | Current density (mA/cm²) Cell voltage 0.5 V | Remarks |
|---|---|---|---|---|
| MEA49 | AA | 170 | 1310 | Example |
| MEA50 | AB | 160 | 1170 | |

Example 10

Carbon cloth (made by ElectroChem, EC-CC1-060) was prepared, then dipped in a Teflon dispersion diluted to 5%, then dried and was further raised in temperature in an argon stream to 340° C. to prepare a gas diffusion fiber layer.

Further, 99 g of ethanol was added to each of the carbon materials AC, AD, and AE shown in Table 18, then the carbon material was crushed by a ball mill to obtain a primary dispersion. After this, while stirring the primary dispersion, 0.833 g of a 30% Teflon dispersion was added dropwise bit by bit to prepare a micropore layer slurry.

Each slurry was spray coated on one surface of a previously prepared gas diffusion fiber layer and dried in an argon stream at 80° C., then the temperature was raised to 340° C. to thereby prepare three types of gas diffusion layers comprised of stacked gas diffusion fiber layers and micropore layers.

TABLE 18

| Type of carbon material | Volume of pores of 2 nm or less size ml/g | Nitrogen adsorption specific area (Y) m²/g | DBP oil absorption (X) ml/100 g | X/Y | Amount of adsorption of water vapor ml/g |
|---|---|---|---|---|---|
| AC | 0.01 | 72 | 170 | 2.36 | 3.86 |
| AD | 0.05 | 227 | 219 | 0.96 | 59.8 |
| AE | 0.01 | 40 | 159 | 3.98 | 3.56 |
| AF | 0.39 | 1582 | 515 | 0.33 | 158 |

A catalyst carrier comprised of the carbon material AF shown in Table 18 was dispersed in water. While holding this at 50° C. and stirring, a hydrogen hexachloroplatinate aqueous solution and a formaldehyde aqueous solution were added to obtain a catalyst precursor.

The catalyst precursor was filtered, rinsed, and dried, then reduced in a 100% $H_2$ stream at 300° C. for 3 hours to prepare the Pt catalyst comprised of the catalyst-carrying carbon material carrying 20 mass % of Pt.

The Pt particle size of the Pt catalyst was 1.8 nm. The crystal particle size was estimated by the Scherrer method from the half value of the (111) peak of platinum obtained by an X-ray diffraction device (made by Rigaku Corporation, Model RAD-3C).

A 5% Nafion solution (made by Aldrich) was added to this catalyst in an argon stream to give a mass of the Nafion solid of two times the mass of the platinum catalyst, this was lightly stirred, then the catalyst was crushed by ultrasonic waves, and butyl acetate was added while stirring to give a solid concentration of the Pt catalyst and Nafion combined of 6 mass % so as to prepare the catalyst slurry.

The carbon material shown in Table 18 was placed in a separate container, butyl acetate was added to give a carbon material of 6 mass %, and the carbon material was crushed by ultrasonic waves to prepare a carbon material slurry.

The above prepared catalyst slurry and carbon material slurry were mixed by a mass ratio of 8:2, then sufficiently stirred to prepare a catalyst layer slurry.

The catalyst layer slurry was spray coated on the micropore layer sides of the above three types of the above gas diffusion layers and dried at 80° C. in an argon stream for 1 hour to prepare three types of solid polymer type fuel cell electrodes having the carbon material AC contained in the catalyst layers as catalyst-carrying carbon materials.

Note that the spray and other conditions were set so that the electrodes had amounts of platinum used of 0.10 mg/cm$^2$.

The amounts of platinum used were found by measuring the dry masses of the electrodes before and after spray coating and calculating the amounts from the difference.

Further, two 2.5 cm square pieces were cut out from each of the obtained solid polymer type fuel cell electrodes, two of the same type of electrodes were used to sandwich an electrolyte film (Nafion 112) so that the catalyst layers contacted the electrolyte film, and the assemblies were hot pressed at 130° C. by a total pressure of 0.625 t for 3 minutes to prepare three types of MEA51 to MEA53.

The obtained three types of MEA were attached to fuel cell measurement devices and measured for cell performances. The cell performances were measured by changing the voltage between cell terminals in stages from the open voltage (usually 0.9V to 1.0V) to 0.2V and measuring the current density when voltages of 0.9V and 0.5V were flowing between the cell terminals.

As the gas, the cathode was supplied with air and the anode with pure hydrogen to give rates of utilization of 50% and 80%. These gases were adjusted in pressure to 0.1 MPa by a back pressure valve provided downstream from the cell. The cell temperature was set at 80° C., and the supplied air and pure hydrogen were bubbled through distilled water warmed to 80° C. and 90° C. to wet them.

Table 19 shows the results of the cell performance of the three types of MEAs obtained. As a result, the MEAs of the present invention exhibited excellent cell characteristics.

Among these, the MEA51 and MEA53 using carbon materials AC and AE with amounts of adsorption of water vapor of 50 ml/g or less and ratios X/Y of DBP oil absorption X and nitrogen adsorption specific area Y of 1.5 or more for the micropore layers exhibited superior cell performance.

TABLE 19

| Type of MEA | Type of carbon material used for micropore layer | Current density Cell voltage 0.8 V | Current density Cell voltage 0.5 V | Remarks |
|---|---|---|---|---|
| MEA51 | AC | 174 | 1310 | Example |
| MEA52 | AD | 165 | 1170 | |
| MEA53 | AE | 172 | 1307 | |

INDUSTRIAL, APPLICABILITY

As explained above, a fuel cell using the catalyst layer defined in the present invention for at least the cathode is superior in gas diffusion, electron conduction, proton conduction, and wet management in the catalyst layer and is improved in rate of utilization of the catalyst ingredient, so the amount of the platinum or other precious metal used for the catalyst can be reduced, that is, a fuel cell achieving both lower cost and improved output characteristic can be provided.

Further, according to the present invention, since the characteristics of the carbon black used for the gas diffusion layer are suitable, the inside of the catalyst layer is sufficiently wetted, the produced drops of water etc. are prevented from blocking the gas diffusion paths, and a higher output characteristic can be realized.

Therefore, the present invention has great industrial applicability.

The invention claimed is:

1. A fuel cell comprised of a proton conductive electrolyte film sandwiched by a pair of catalyst layers, and a separate gas diffusion layer, wherein at least a catalyst layer of a cathode is comprised of a mixture of a catalyst ingredient, an electrolytic material, and a carbon material, said carbon material is comprised of a catalyst-carrying carbon material carrying said catalyst ingredient and a gas-diffusing carbon material not carrying said catalyst ingredient, and said catalyst-carrying carbon material has an adsorption of water vapor in the range of 103.5 ml/g to 1500 ml/g at 25° C. and a relative humidity of 90% and said gas-diffusing carbon material has an amount of adsorption of water vapor of 1 ml/g or more and 100 ml/g or less at 25° C. and a relative humidity of 90%, wherein the carbon materials are respectively coagulated, and the coagulated phases of 1 µm or less in size made of the gas-diffusing carbon material and the coagulated phases of 1 µm or less in size made of the catalyst-carrying carbon material are uniformly and evenly distributed throughout the mixture.

2. The fuel cell as set forth in claim 1, wherein said catalyst-carrying carbon material is activated carbon, a surface area BET evaluated by BET satisfies SBET≥1500 m$^2$/g, and a ratio of the surface area of micropores having a diameter of 2 nm or less, S micro (m$^2$/g), to the total pore area, S total (m$^2$/g), satisfies S micro/S total is greater than or equal to 0.5.

3. The fuel cell as set forth in claim 2, characterized in that said activated carbon has an average diameter of micropores having a diameter of 2 nm or less of 0.7 nm to 1.5 nm.

4. The fuel cell as set forth in claim 2 or 3, characterized in that said activated carbon has an oxygen content of 5 mass % or less.

5. The fuel cell as set forth in claim 1, wherein said catalyst-carrying carbon material has a volume of micropores having a diameter of 2 nm or less of 0.1 ml/g or more, and said catalyst-carrying carbon material has a DBP oil absorption of 300 ml/100 g or more.

6. The fuel cell as set forth in claim 5, characterized in that said catalyst-carrying carbon material has a specific surface area SBET by the BET method of 500 m$^2$/g or more.

7. The fuel cell as set forth in any one of claim 1, 2 or 5, characterized in that said gas-diffusing carbon material is included in the catalyst layer in an amount of 5 mass % to 50 mass %.

8. The fuel cell as set forth in any one of claim 1, 2 or 5, characterized in that said gas-diffusing carbon material has an amount of adsorption of water vapor of 1 ml/g to 50 ml/g at 25° C. and a relative humidity of 90%.

9. The fuel cell as set forth in any one of claim 1, 2 or 5 characterized in that said catalyst ingredient contains an N4-chelate-type metal complex.

10. The fuel cell as set forth in claim 9, characterized in that said metal complex is a N4-chelate-type complex structure and two or more of the N atoms bonded with a center metal are imine types.

11. The fuel cell as set forth in claim 9, characterized in that said metal complex has an O-O bond distance of oxygen molecules bonded with the complex center metal in an adsorption structure of a metal complex and oxygen molecules calculated by the B3LYP density function method of 0.131 nm or more.

12. The fuel cell as set forth in claim 11, characterized in that said N4-chelate-type metal complex is one or both of the following general formula 1 or general formula 2, (general formula 1)

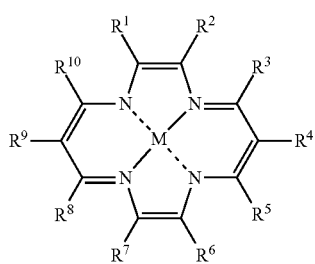

(wherein, M is a metal atom, and each of $R^1$ to $R^{10}$ is hydrogen or a substituent group)

(general formula 2)

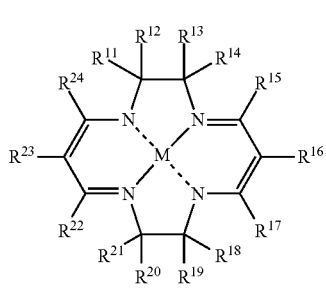

(wherein, M is a metal atom, and each of $R^{11}$ to $R^{24}$ is hydrogen or a substituent group).

13. The fuel cell as set forth in claim 9, characterized in that said metal complex has a complex center metal of one or more types of metal selected from the transition metals of Group V, Group VI, Group VII, or Group VIII of the Periodic Table.

14. The fuel cell as set forth in claim 9, characterized by further containing as said catalyst ingredient a precious metal.

15. The gas diffusion electrode of any one of claim 1, 2 or 5, further comprising:
a micropore layer having carbon black as its main ingredient formed opposite a surface of said catalyst layer, and
a gas diffusion fiber layer having fibrous carbon material as its main ingredient formed on said micropore layer, wherein the carbon black of said micropore layer has an amount of adsorption of water vapor of 100 ml/g or less at 25° C. and a relative humidity of 90%.

16. The gas diffusion electrode as set forth in claim 15, characterized in that the main ingredient carbon black of said micropore layer has a ratio X/Y of a DBP oil absorption X ml/100 g and a nitrogen adsorption specific area Y m²/g of 1 or more.

17. The fuel cell as set forth in claim 11 wherein the N4-chelate-type metal complex is selected from the group consisting of 5, 7, 12, 14-tetramethyl-1, 4, 8, 11-tetraazacyclotetradeca-2, 4, 6, 9, 11, 13-hexaene; 5, 7, 12, 14-tetramethyl-1, 4, 8, 11-tetraazacyclotetradeca-4, 6, 11, 13-tetraene; and 6, 13-diphenyl-1, 4, 8, 11-tetraazacyclotetradeca-2, 4, 6, 9, 11, 13-hexaene.

18. The fuel cell as set forth in claim 12 wherein $R^1$ through $R^{24}$ are independently selected from the group consisting of hydrogen, alkyl and aryl substituents.

19. The fuel cell as set forth in claim 12 wherein $R^1$ through $R^{24}$ are independently a hydrogen or a methyl substituent.

20. The fuel cell as set forth in claim 12 wherein M is cobalt or iron.

21. The fuel cell as set forth in claim 1 wherein the catalyst-carrying carbon material is chemically treated to increase the amount of adsorption of water vapor.

22. The fuel cell as set forth in any one of claim 1, 2 or 5, characterized in that said gas-diffusing carbon material is included in the catalyst layer in an amount of 10 mass % to 35 mass %.

23. The fuel cell as set forth in claim 1 wherein the catalyst layer is obtained by mixing the catalyst-containing carbon material, gas-diffusing carbon material, and a solution containing an electrolyte dissolved or dispersed in the solution, and a sufficient amount of a solvent to prepare an ink, and drying the ink in a film state.

24. The fuel cell as set forth in claim 1 characterized in that said catalyst layer is formed by drying an ink film prepared by mixing an electrolytic material, a catalyst-carrying carbon material carrying said catalyst ingredient and a gas diffusing carbon material not carrying said catalyst ingredient in a sufficient amount of solvent.

25. The fuel cell as set forth in claim 1 characterized in that the catalyst-containing carbon material, the gas-diffusing carbon material and the electrolyte material are dispersed within the catalyst layer.

26. The fuel cell as set forth in claim 1 characterized in that said gas-diffusing carbon material has a primary particle size of 1 μm or less.

* * * * *